US012129984B2

(12) United States Patent
Kim

(10) Patent No.: US 12,129,984 B2

(45) Date of Patent: Oct. 29, 2024

(54) LAMP FOR VEHICLE

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/527,482

(22) Filed: Dec. 4, 2023

(65) Prior Publication Data

US 2024/0218996 A1 Jul. 4, 2024

(51) Int. Cl.

*F21S 41/675* (2018.01)
*F21S 2/00* (2016.01)
*F21S 41/33* (2018.01)
*F21S 41/657* (2018.01)

(52) U.S. Cl.

CPC ............. *F21S 41/675* (2018.01); *F21S 2/005* (2013.01); *F21S 41/33* (2018.01); *F21S 41/657* (2018.01)

(58) Field of Classification Search

CPC ........ F21S 41/675; F21S 41/33; F21S 41/657; F21S 2/005; B60Q 1/2657

See application file for complete search history.

(56) References Cited

U.S. PATENT DOCUMENTS

2017/0174121 A1* 6/2017 Wasilewski ............. F21S 43/14
2020/0173622 A1* 6/2020 Fritzon ................. F21S 41/689
2021/0140601 A1* 5/2021 Baek ........................ F21V 29/70
2021/0140602 A1* 5/2021 Youn ..................... F21S 41/657

* cited by examiner

*Primary Examiner* — Tracie Y Green
*Assistant Examiner* — Michael Chiang
(74) *Attorney, Agent, or Firm* — NovoTechIP International PLLC

(57) ABSTRACT

Disclosed is a lamp for a vehicle including a plurality of lamp modules, and optical connection units provided between adjacent lamp modules, and each including a connection light source part, the lamp modules include a first optical unit that forms a first light distribution part with light irradiated from a first light source part and that is movable, a second optical unit that forms a second light distribution part with light irradiated from a second light source part, provided around the first optical unit, and that is rotatable, and a third optical unit that forms a third light distribution part with light irradiated from a third light source part, the light irradiated from the third light source part outputs to an outside in a state, in which the first optical unit is moved and the second optical unit is rotated.

20 Claims, 29 Drawing Sheets

LAMP FOR VEHICLE

CROSS-REFERENCE TO RELATED APPLICATIONS

This application claims the benefit of priority to Korean Patent Application No. 10-2023-0000885, filed in the Korean Intellectual Property Office on Jan. 3, 2023, the entire contents of which are incorporated herein by reference.

TECHNICAL FIELD

The present disclosure relates to a lamp for a vehicle, and more particularly, to a lamp for a vehicle that may implement various lamp images.

BACKGROUND

In general, a vehicle is provided with various kinds of lamps having a lighting function for easily identifying an object that is located around the vehicle during nighttime driving, and a signal function for informing another vehicle or road users of a driving state of the vehicle.

For example, headlamps (headlights) and fog lamps for the purpose of a lighting function, turn signal lamps, tail lamps, brake lamps, side markers, and the like for the purpose of signal functions are mainly included, and installation references and standards of the lamps for a vehicle are defined by the rules such that they sufficiently show their functions. In recent years, in addition to a means for irradiating light of a lamp for a vehicle or a means for informing an outside of signals, differentiation of design elements of the lamp has become more important. Accordingly, lamps for a vehicle, on which light sources in various forms of matrixes are mounted have been developed.

However, a conventional lamp for a vehicle generally forms a static lamp image by using a light source that is installed in a fixed structure, and thus there is a limit in expressing various designs with images, in which light is distributed.

Furthermore, even when a dynamic image is implemented by using parts that drive conversion dynamically, an intermittent texture of the lamp image occurs due to a space for conversion of parts that performs dynamic conversion.

Accordingly, it is necessary to improve a technology for improving a connection texture while giving an improved visual effect in design by implementing various lamp images.

SUMMARY

The present disclosure has been made to solve the above-mentioned problems occurring in the prior art while advantages achieved by the prior art are maintained intact.

An aspect of the present disclosure provides a lamp for a vehicle that implements lamp images of various designs by converting an image of an entire light distribution part in a three-dimensional way and dynamically.

Another aspect of the present disclosure provides a lamp for a vehicle that may increase an entire amount of light and thus may secure a stability of the vehicle by enhancing a visibility, in particular, in bad weather.

Another aspect of the present disclosure provides a lamp for a vehicle that improves an intermittent texture of a lamp image and minimizes exposure of internal parts to an outside.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a plurality of lamp modules, and optical connection units provided between adjacent lamp modules, and each including a connection light source part, the lamp modules include a first optical unit that forms a first light distribution part with light irradiated from a first light source part and that is movable, a second optical unit that forms a second light distribution part with light irradiated from the second light source part, provided around the first optical unit, and that is rotatable, and a third optical unit that forms a third light distribution part with light irradiated from a third light source part, the light irradiated from the third light source part outputs to an outside in a state, in which the first optical unit is moved and the second optical unit is rotated, and the optical connection unit connects adjacent second optical units when the second optical units are moved or not moved.

A lighting image formed when the first light source part, the second light source part, and the third light source part are turned on may be converted through movement of the first optical unit and the second optical unit.

The lighting image may include a first lighting image formed when the first light source part and the second light source part are turned on in an initial state, and a second lighting image formed to include the first light source part, the second light source part, and the third light source part in a state, in which the first optical unit is moved and the second optical unit is rotated.

The connection light source part may connect adjacent second light source parts.

The lamp modules may include a base plate part, a movable part connected to the base plate part, connected to the first light source part, and that moves the first light source part, a rotatable part connected to the base plate part, connected to the second light source part, and that rotates the second light source part while interworking with the movable part, and a driving part that provides driving power to the movable part and the rotatable part, and the rotatable part may include a rotary bezel coupled to the second light source part and mounted on the base plate part to be rotatable.

The lamp may further include a lamp housing, on which the plurality of lamp modules and the optical connection units are mounted, and the optical connection units further include connection structures coupled to the lamp housing, on which the connection light source parts are mounted, and provided between rotary bezels provided between two adjacent second optical units.

When a direction, in which lights are output from the lamp modules, is defined as a forward direction, an opposite direction to the forward direction is defined as a rearward direction, a direction, in which adjacent lamp modules are arranged, is defined as a first direction, and a direction that is perpendicular to the forward direction and the first direction is defined as a second direction, the connection structure may include an upper end part coupled to the connection light source part, a pair of extension parts extending from opposite ends of the upper end part in the first direction, to a rear side, and that stops the rotary bezel during rotation of the second optical unit, and a coupling part protruding from the extension part and coupled to the lamp housing.

The pair of extension parts may include extension bodies that becomes farther away from each other as they go from the upper end part rearwards, and formed to be curved in a direction, in which they face each other, and first separation preventing bosses formed at upper ends of the extension bodies to stop the rotary bezel, and protruding toward the rotary bezel.

The pair of extension parts may further include second separation preventing bosses formed at lower ends of the extension bodies to stop the rotary bezel and protruding toward the rotary bezel.

The driving part may include a first driving shaft that is moved forwards or rearwards with driving power, and the movable part may include a first retainer coupled to the first driving part, a first retainer holder, one side of which is coupled to the first retainer and in which a first movable rod, a lengthwise direction of which is a central axis of the first driving shaft, extends from an opposite side thereof, a first main bezel, in which the first light source part is installed, and fixed to one end of the movable rod, and a first movable plate having a through-hole configured such that the first movable rod passes therethrough, and provided on a lower side of the main bezel to be spaced apart therefrom.

The driving part may include a second driving shaft that is moved forwards or rearwards by driving power, and the movable part may include a second movable rod extending along a central axis of the second driving shaft, and an end of which is coupled to the second driving shaft to be moved together with the second driving shaft, a second main bezel, in which the first light source is installed, and fixed to an opposite end of the second movable rod in a lengthwise direction thereof, and a second movable plate fixed to the second movable rod and that is spaced apart from the second main bezel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments that are suitable for helping understand the technical features of a lamp for a vehicle according to the present disclosure. However, the present disclosure is not restricted to the embodiments described below to be applied or the technical features of the present disclosure are not limited by the described embodiment, and various modifications may be carried out without departing from the technical range of the present disclosure.

Figure 1:
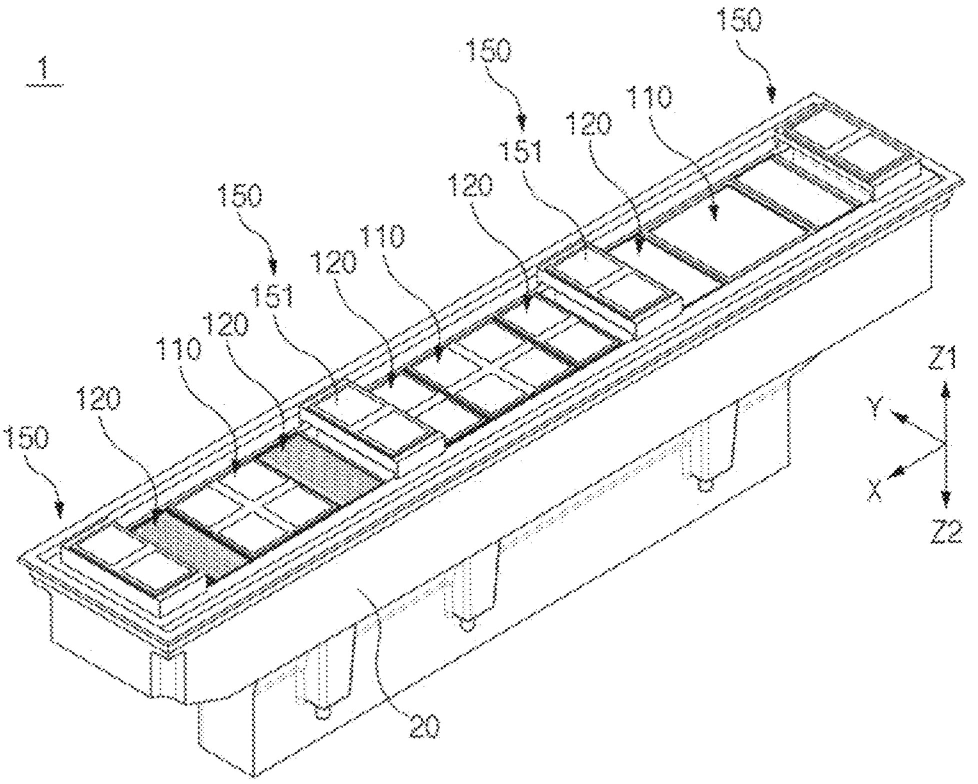
FIG. 1 is a perspective view illustrating a lamp for a vehicle according to a first embodiment of the present disclosure.
Figure 2:
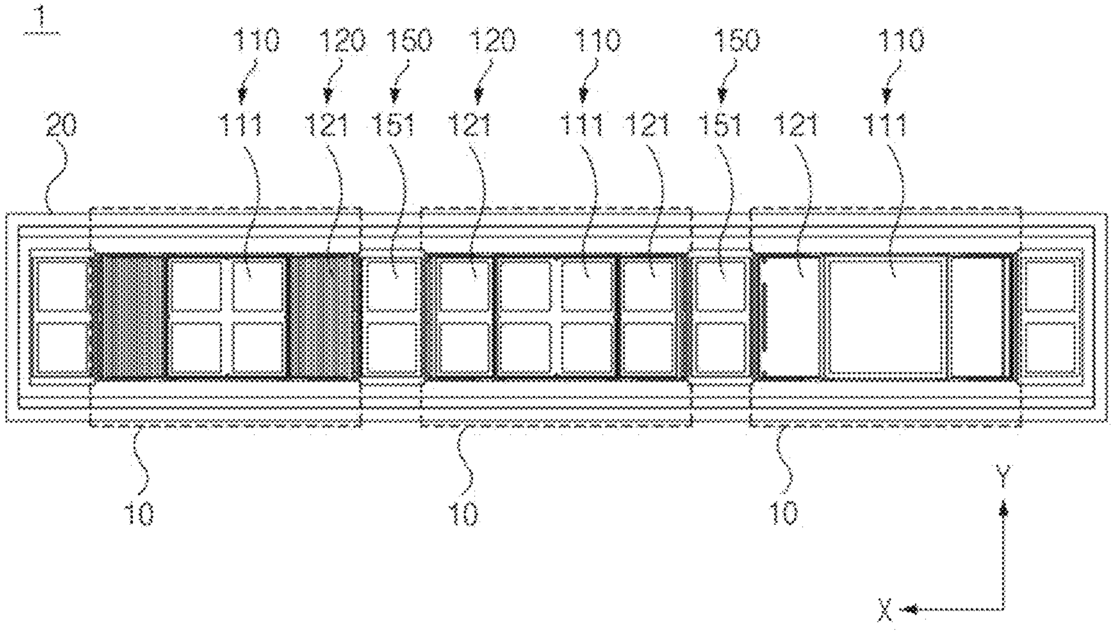
FIG. 2 is a front view illustrating a lamp for a vehicle according to a first embodiment of the present disclosure, when viewed from a front side.
Figure 3:
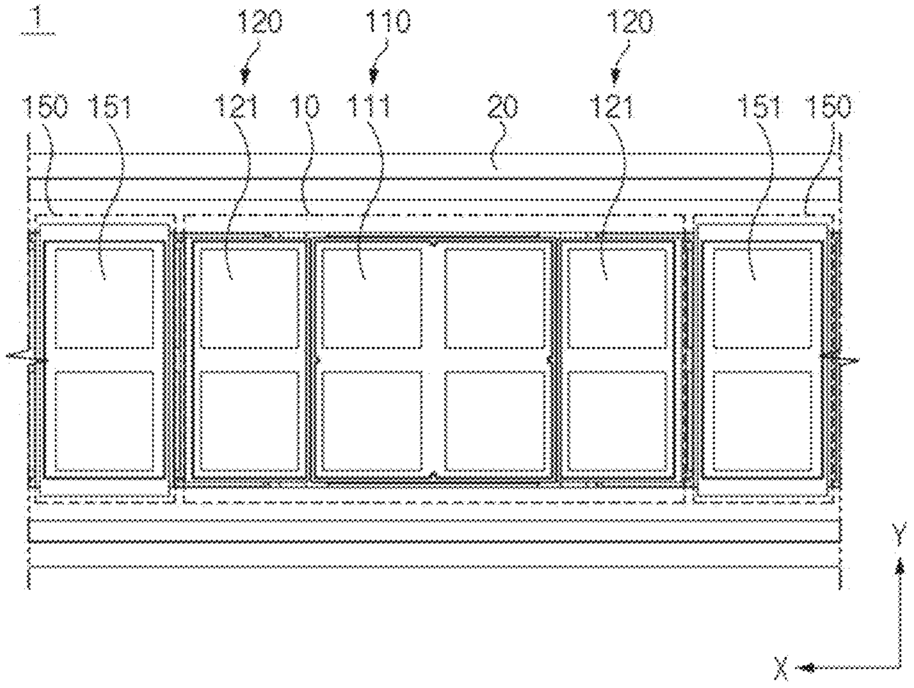
FIG. 3 illustrates a lamp for a vehicle according to a first embodiment of the present disclosure, and is an enlarged view of FIG. 2.
Figure 4:
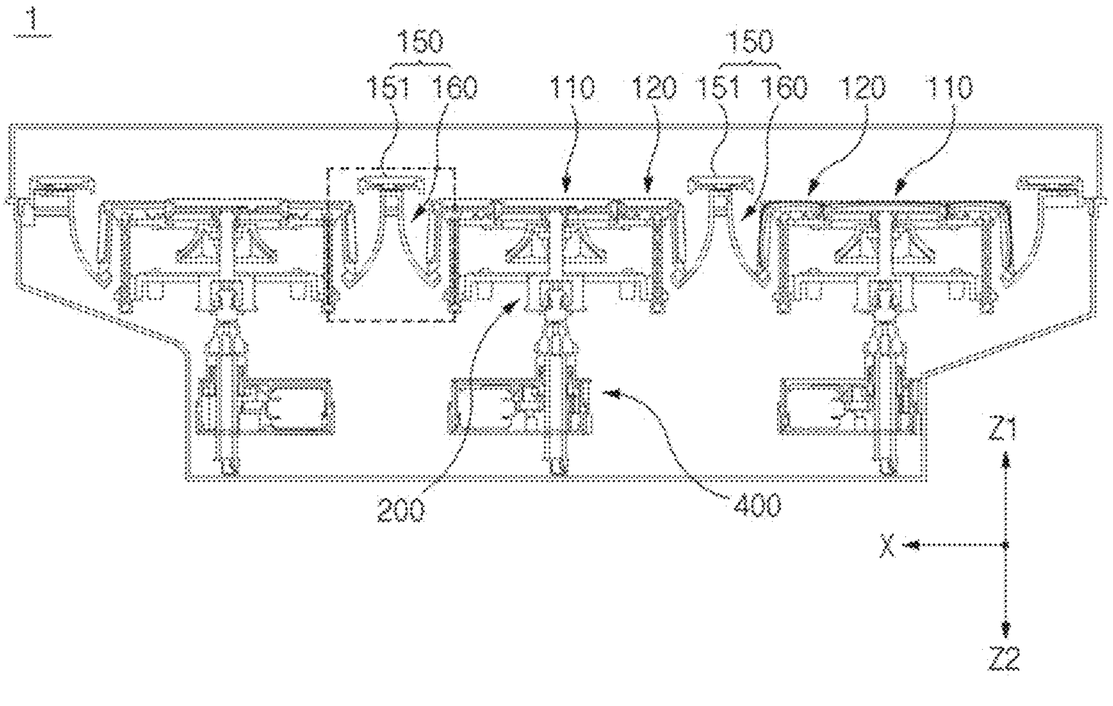
FIG. 4 is a cross-sectional view of the lamp for a vehicle according to a first embodiment of the present disclosure, which is illustrated in FIG. 1.
Figure 5:
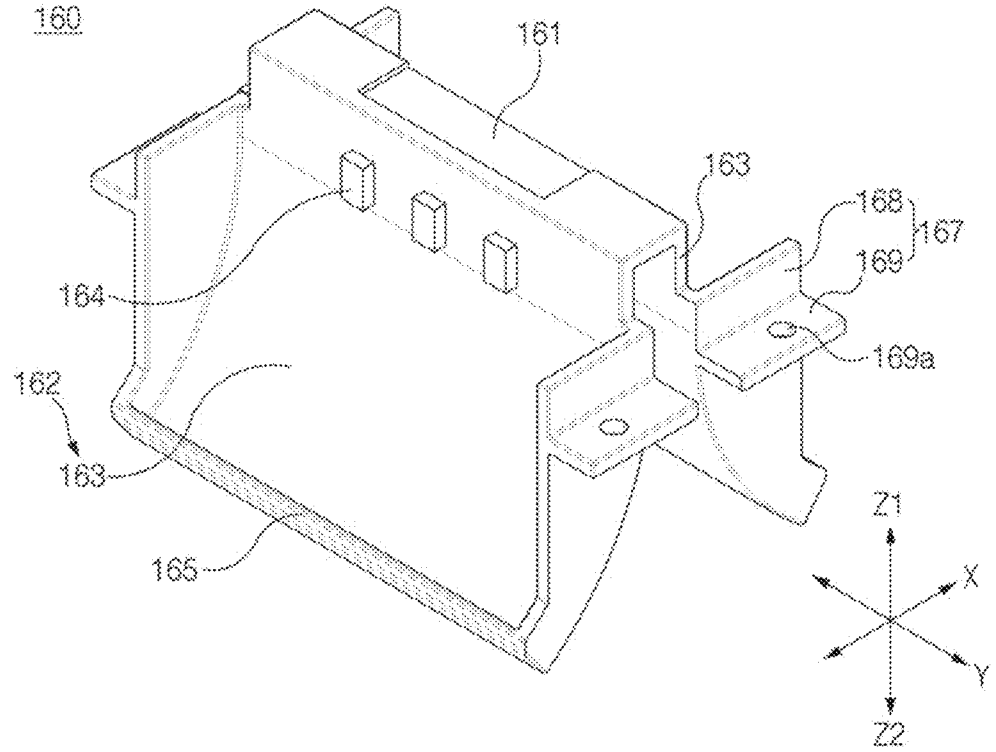
FIG. 5 is a perspective view illustrating a connection structure applied to a lamp for a vehicle according to a first embodiment of the present disclosure.
Figure 6:
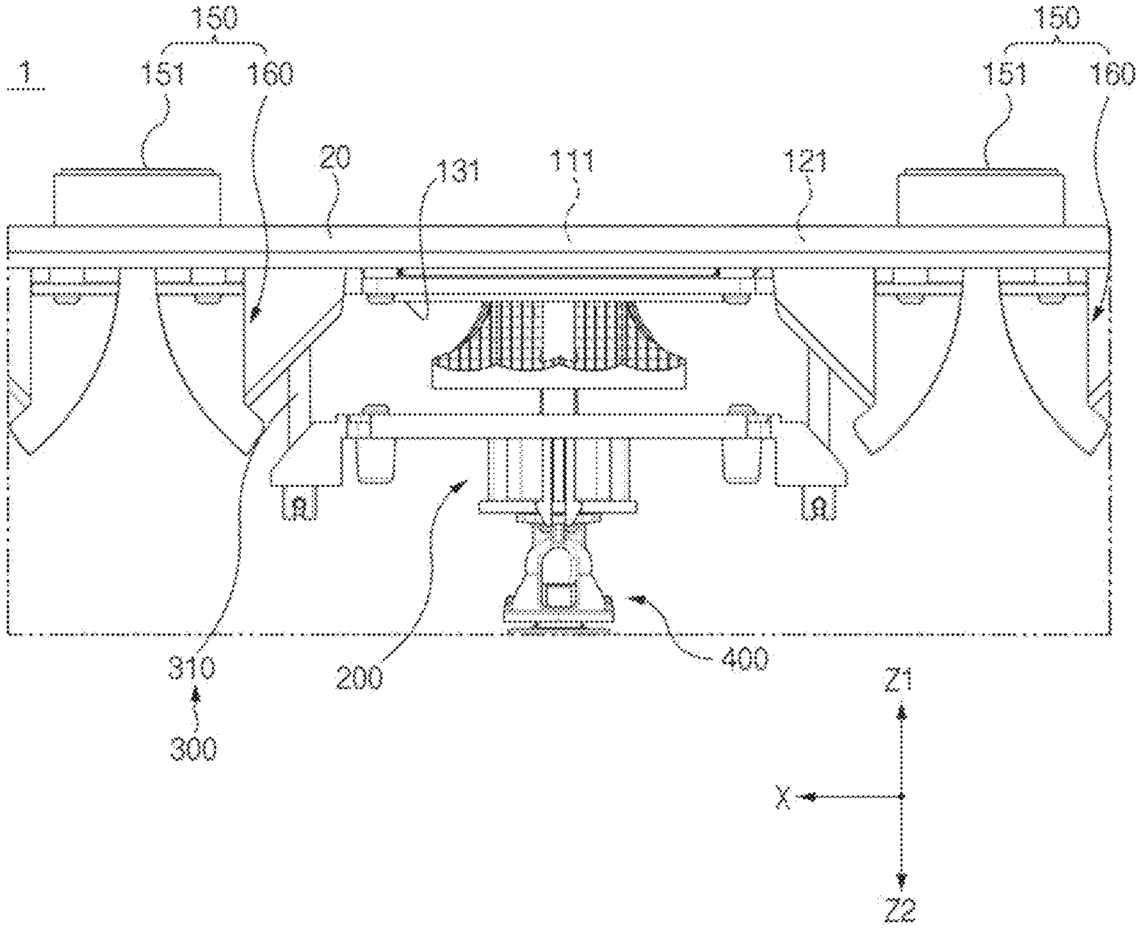
FIG. 6 is a side view illustrating a lamp for a vehicle according to a first embodiment of the present disclosure.
Figure 7:
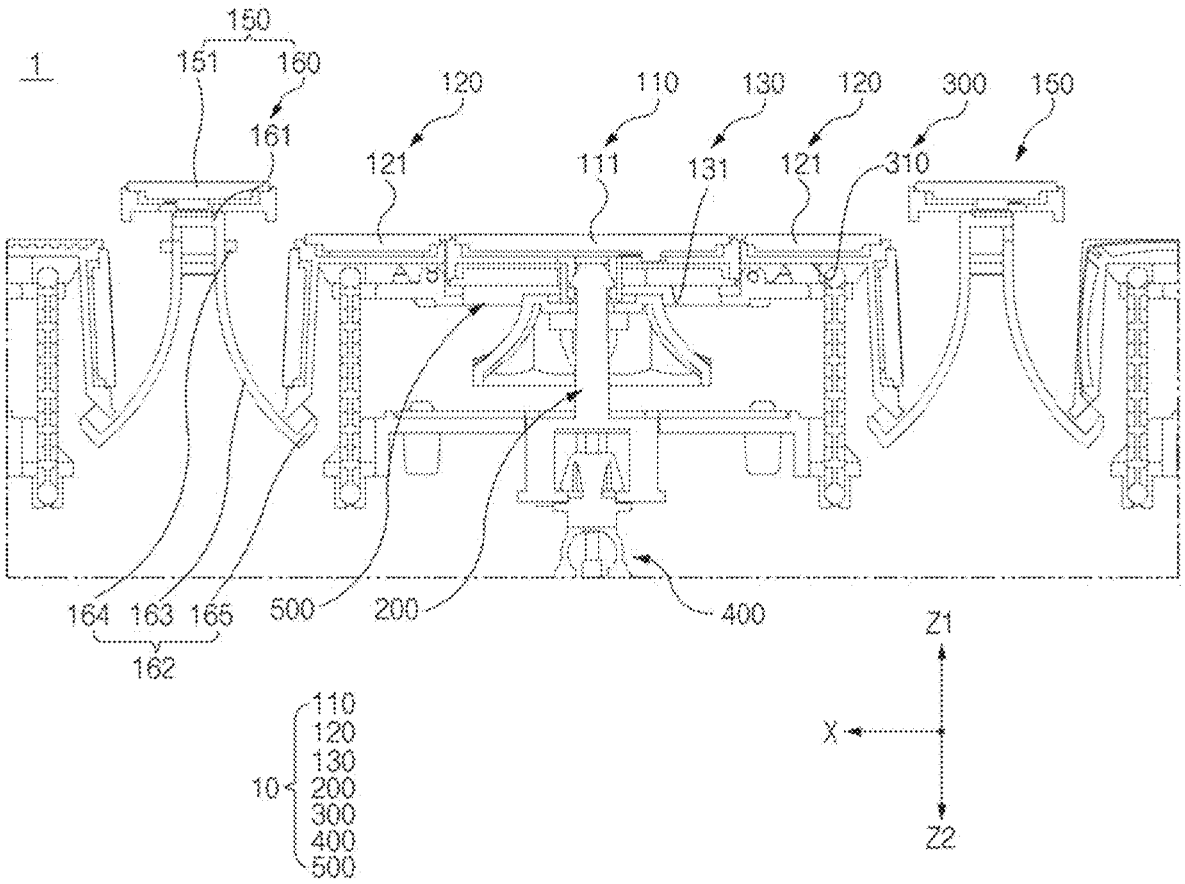
FIG. 7 illustrates a lamp for a vehicle according to a first embodiment of the present disclosure, and is a cross-sectional view illustrating a cross-section of FIG. 6.
Figure 8:
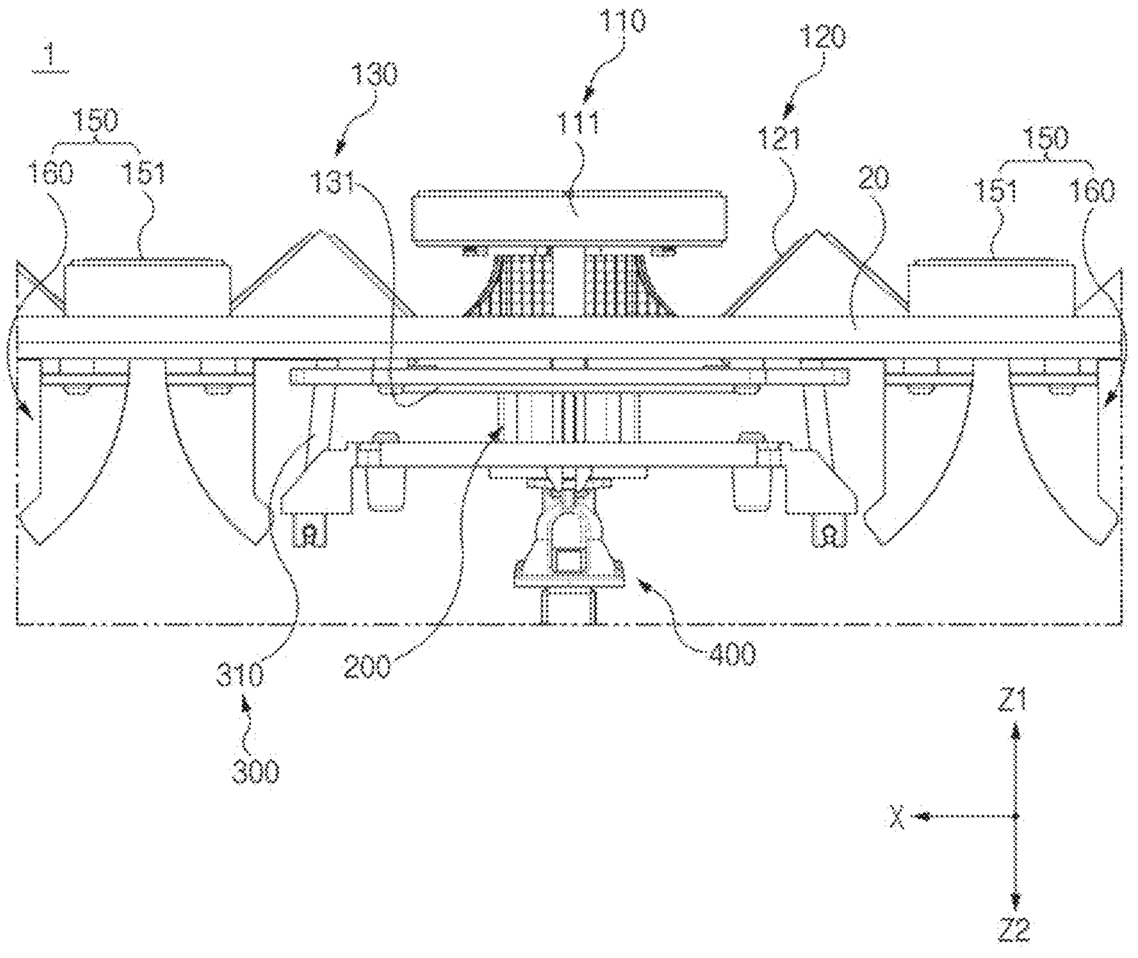
FIG. 8 illustrates an operation of a lamp for a vehicle according to a first embodiment of the present disclosure, and illustrates a state, in which a first optical unit is moved forwards and a second optical unit is rotated.
Figure 9:
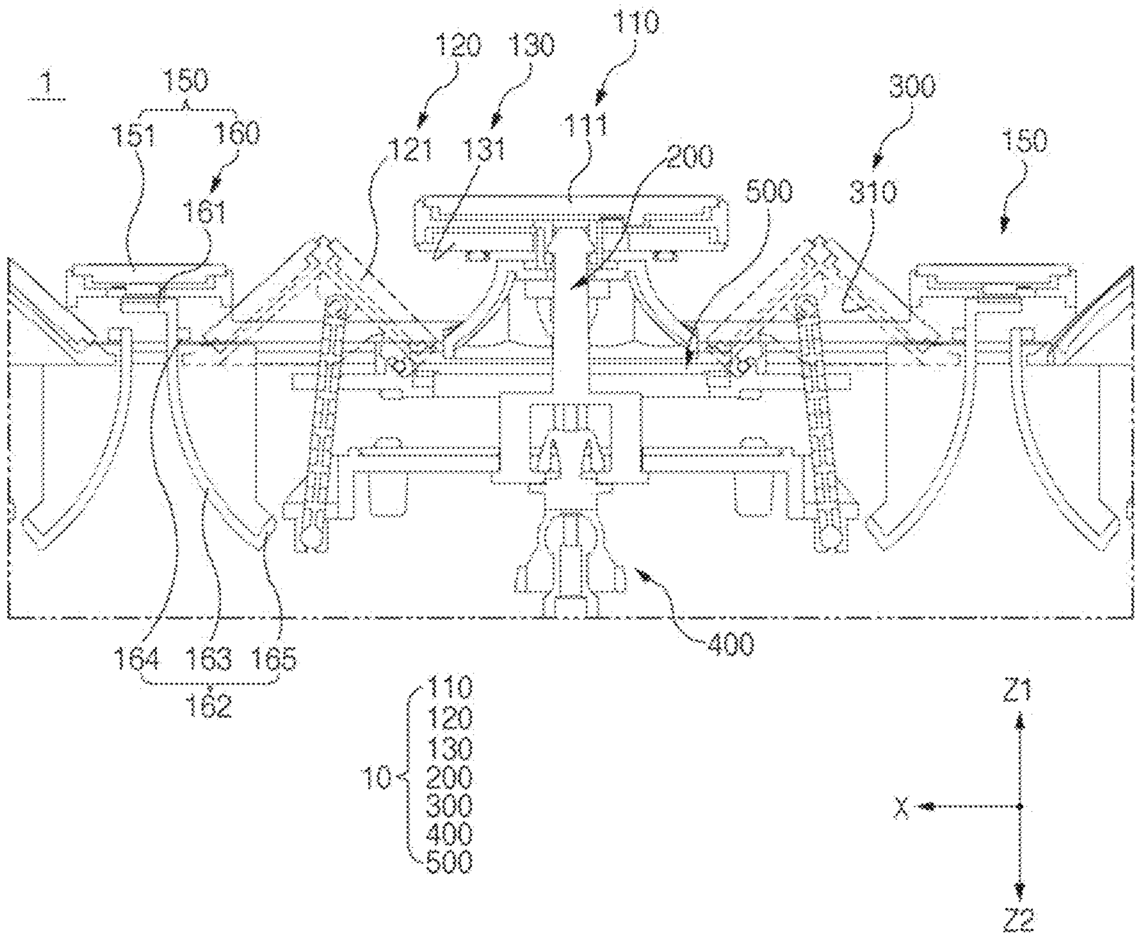
FIG. 9 illustrates an operation of a lamp for a vehicle according to a first embodiment of the present disclosure, and is a cross-sectional view illustrating a cross-section of FIG. 8.
Figure 10:
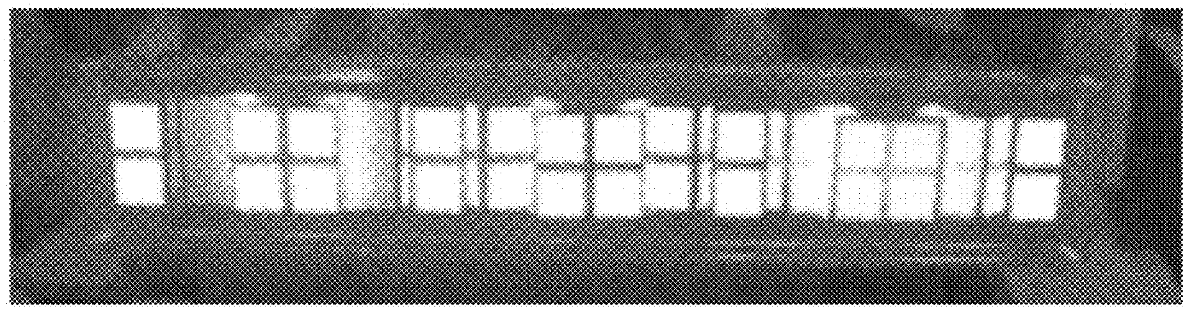
FIG. 10 illustrates a lighting image by a lamp for a vehicle according to a first embodiment of the present disclosure.

FIG. 1 is a perspective view illustrating a lamp for a vehicle according to a first embodiment of the present disclosure, FIG. 2 is a front view illustrating the lamp for a vehicle according to the first embodiment of the present disclosure, when viewed from a front side, FIG. 3 illustrates the lamp for a vehicle according to the first embodiment of the present disclosure, and is an enlarged view of FIG. 2, FIG. 4 is a cross-sectional view of the lamp for a vehicle according to the first embodiment of the present disclosure, which is illustrated in FIG. 1, FIG. 5 is a perspective view illustrating a connection structure applied to the lamp for a vehicle according to the first embodiment of the present disclosure, FIG. 6 is a side view illustrating the lamp for a vehicle according to the first embodiment of the present disclosure, FIG. 7 illustrates the lamp for a vehicle according to the first embodiment of the present disclosure, and is a cross-sectional view illustrating a cross-section of FIG. 6, FIG. 8 illustrates an operation of the lamp for a vehicle according to the first embodiment of the present disclosure, and illustrates a state, in which a first optical unit is moved forwards and a second optical unit is rotated, FIG. 9 illustrates an operation of the lamp for a vehicle according to the first embodiment of the present disclosure, and is a cross-sectional view illustrating a cross-section of FIG. 8, and FIG. 10 illustrates a lighting image by the lamp for a vehicle according to the first embodiment of the present disclosure.

Figure 11:
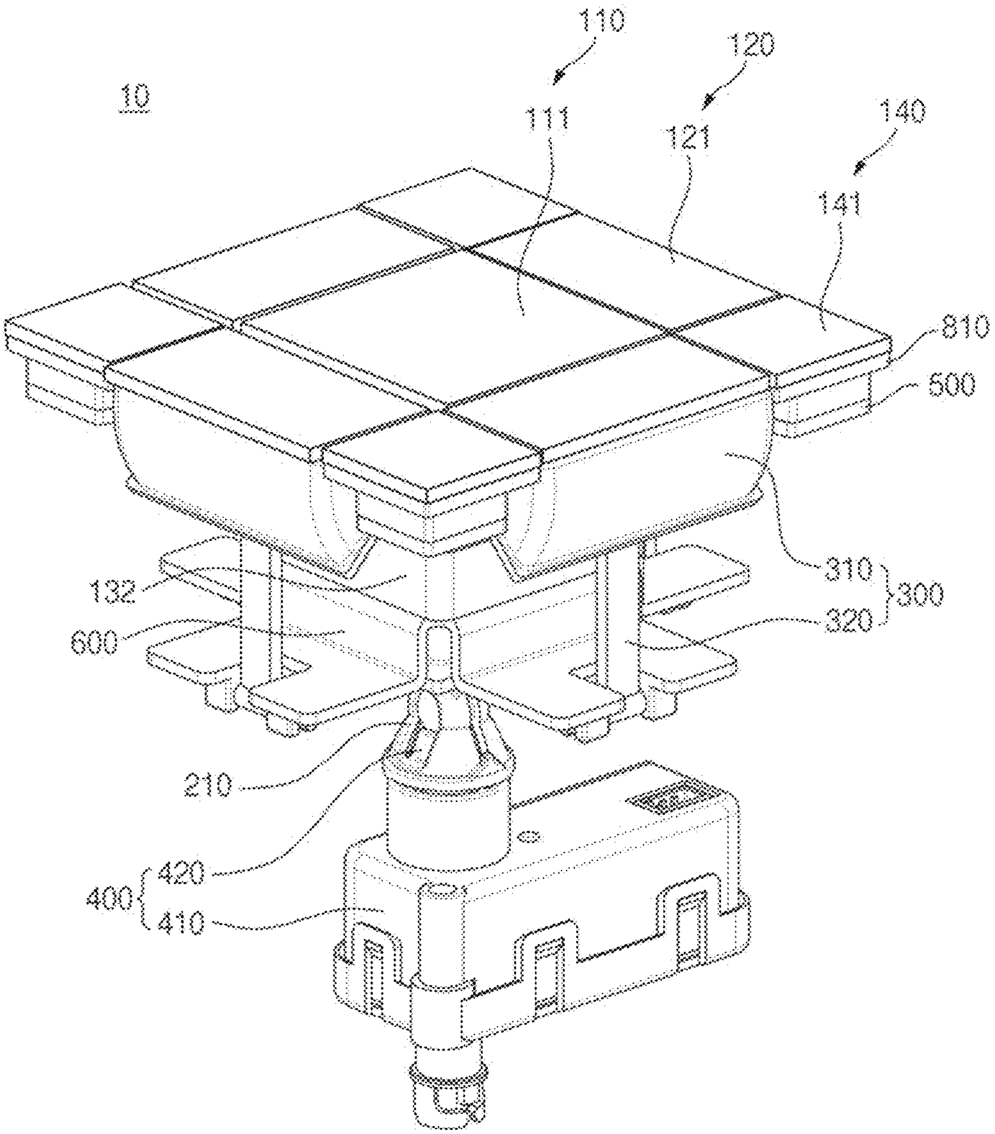
FIG. 11 is a perspective view illustrating a lamp module according to a first embodiment of the present disclosure.
Figure 12:
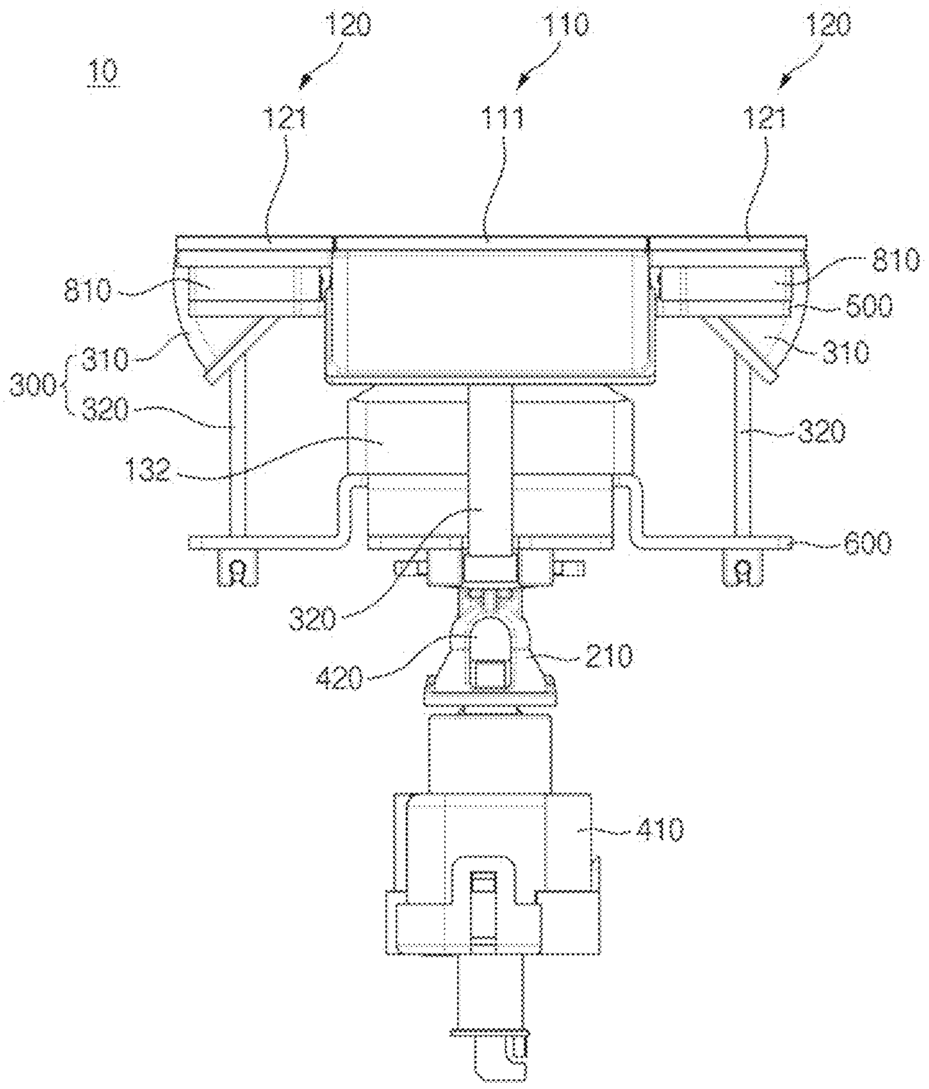
FIG. 12 is a front view illustrating a front side of a lamp for a vehicle according to a first embodiment of the present disclosure.
Figure 13:
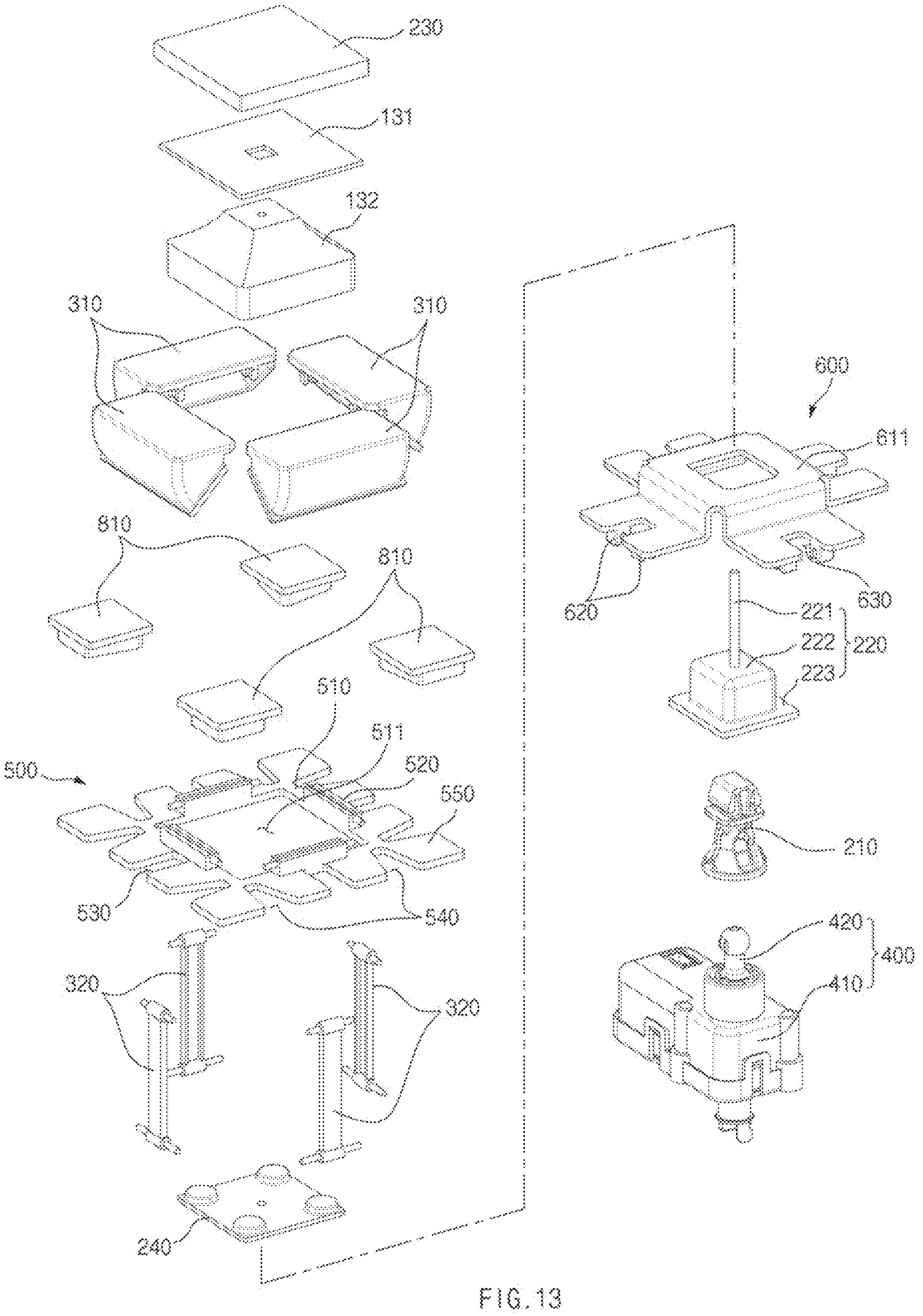
FIG. 13 is an exploded perspective view of the lamp for a vehicle according to a first embodiment of the present disclosure, which is illustrated in FIG. 11.
Figure 14:
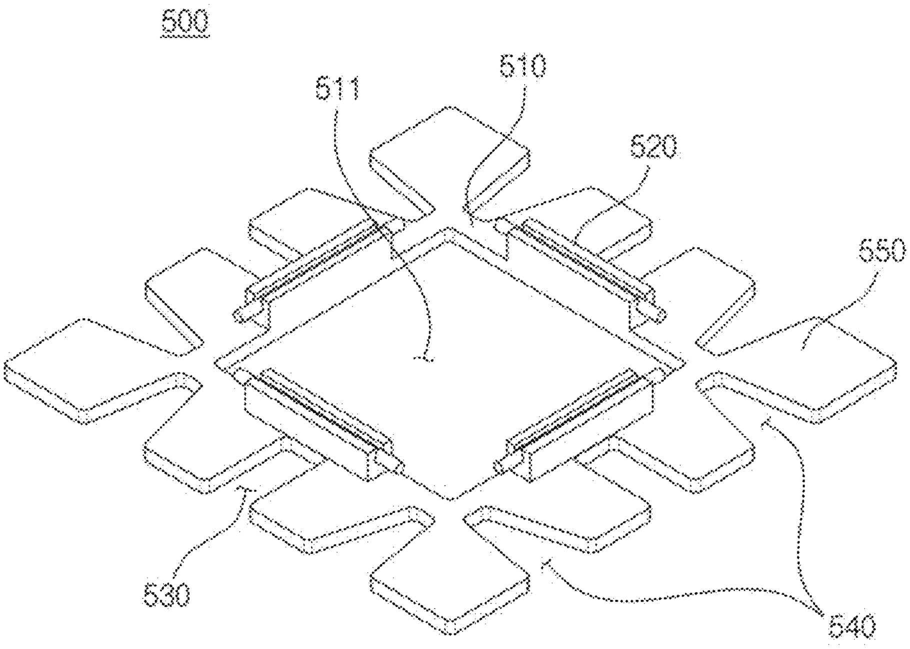
FIG. 14 is a perspective view illustrating a first base plate according to a first embodiment of the present disclosure.
Figure 15:
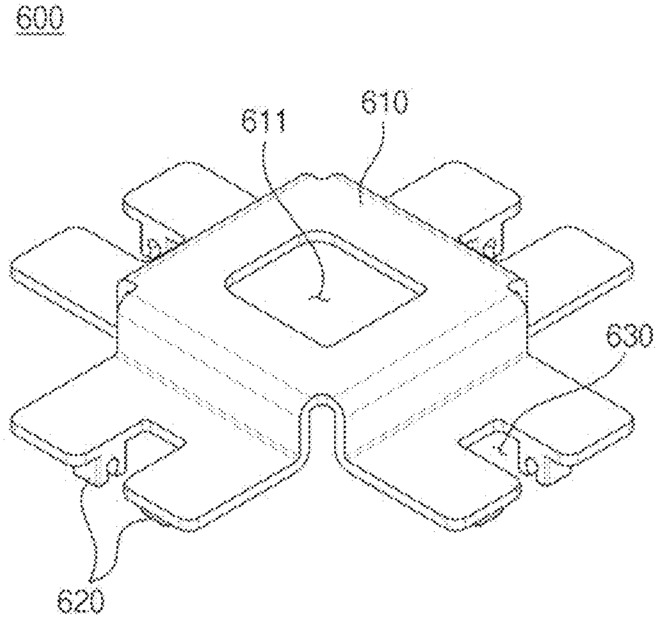
FIG. 15 is a perspective view illustrating a second base plate according to a first embodiment of the present disclosure.
Figure 16:
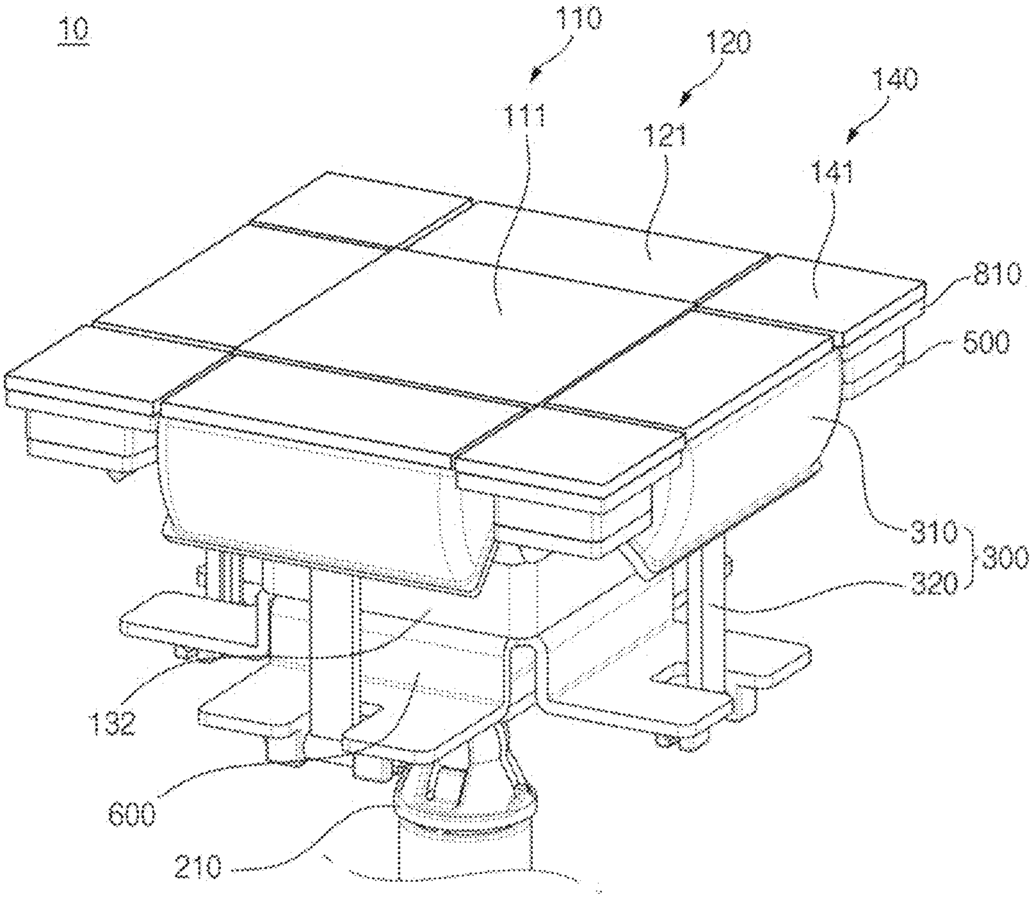
FIG. 16 is a perspective view illustrating a portion of FIG. 11.
Figure 17:
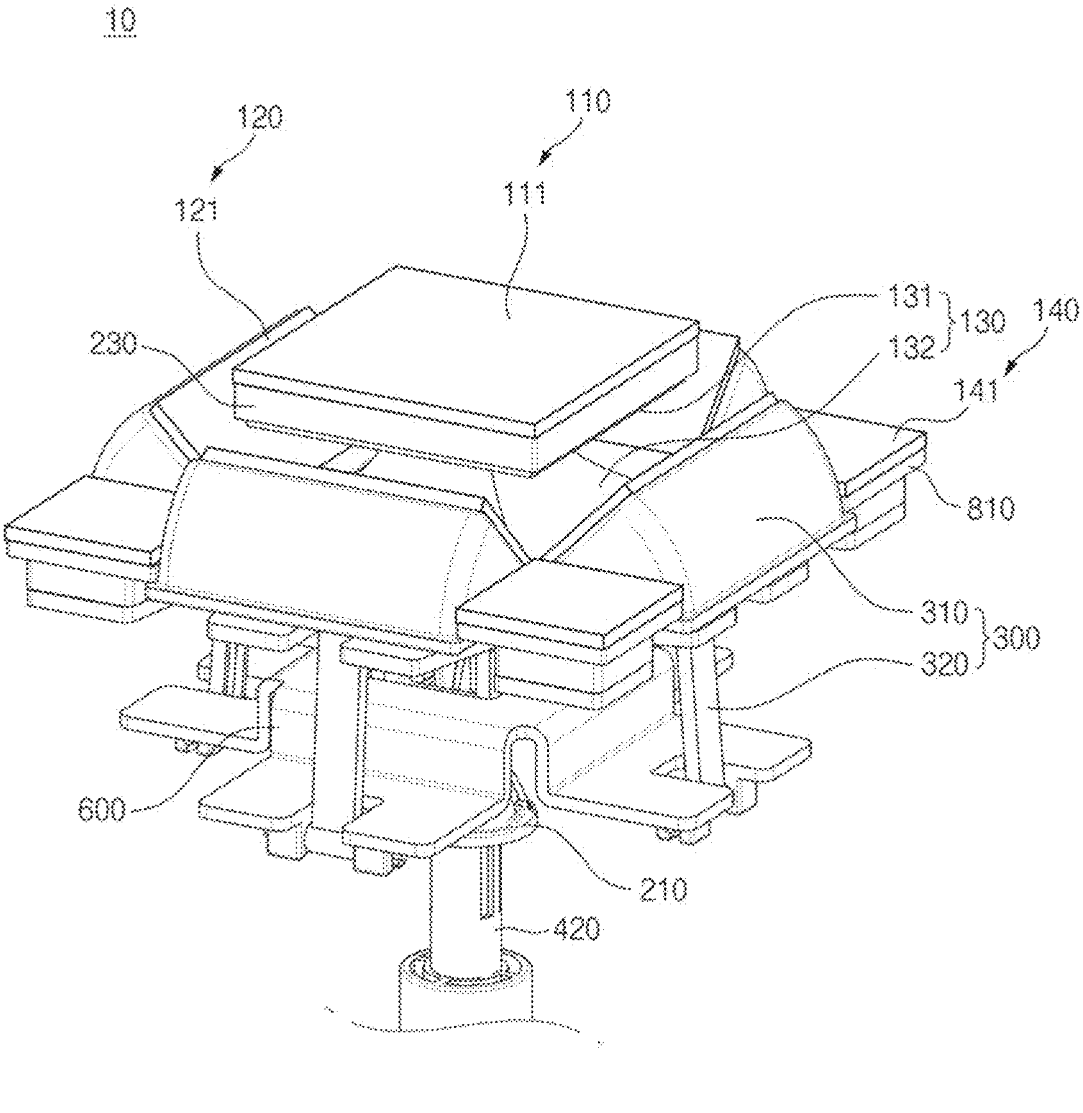
FIG. 17 illustrates an operation of a lamp for a vehicle according to a first embodiment of the present disclosure, and illustrates a state, in which a movable part and a rotatable part are operated in FIG. 6.
Figure 18:
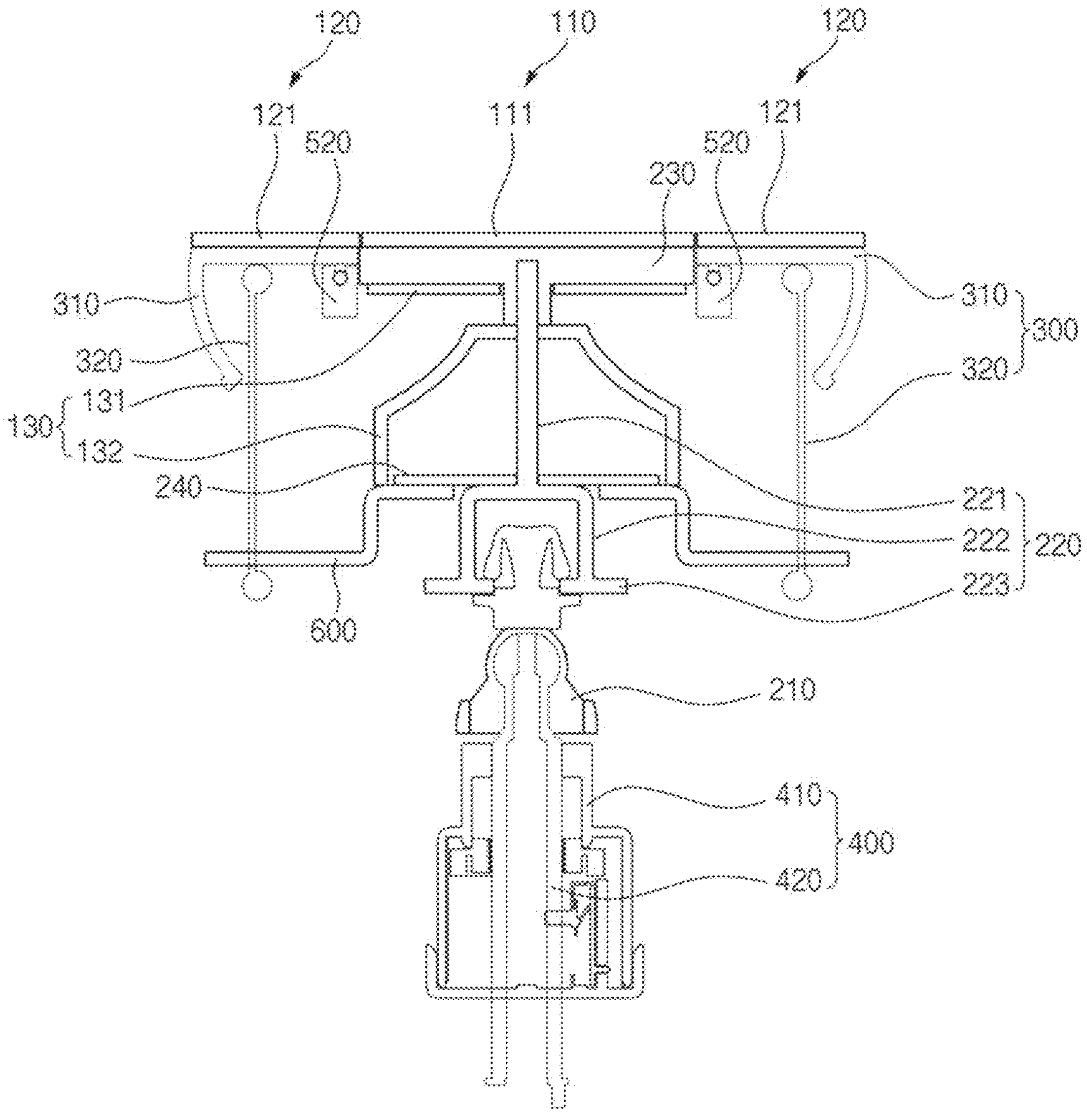
FIG. 18 is a cross-sectional view illustrating a cross-section of a lamp for a vehicle according to a first embodiment of the present disclosure.
Figure 19:
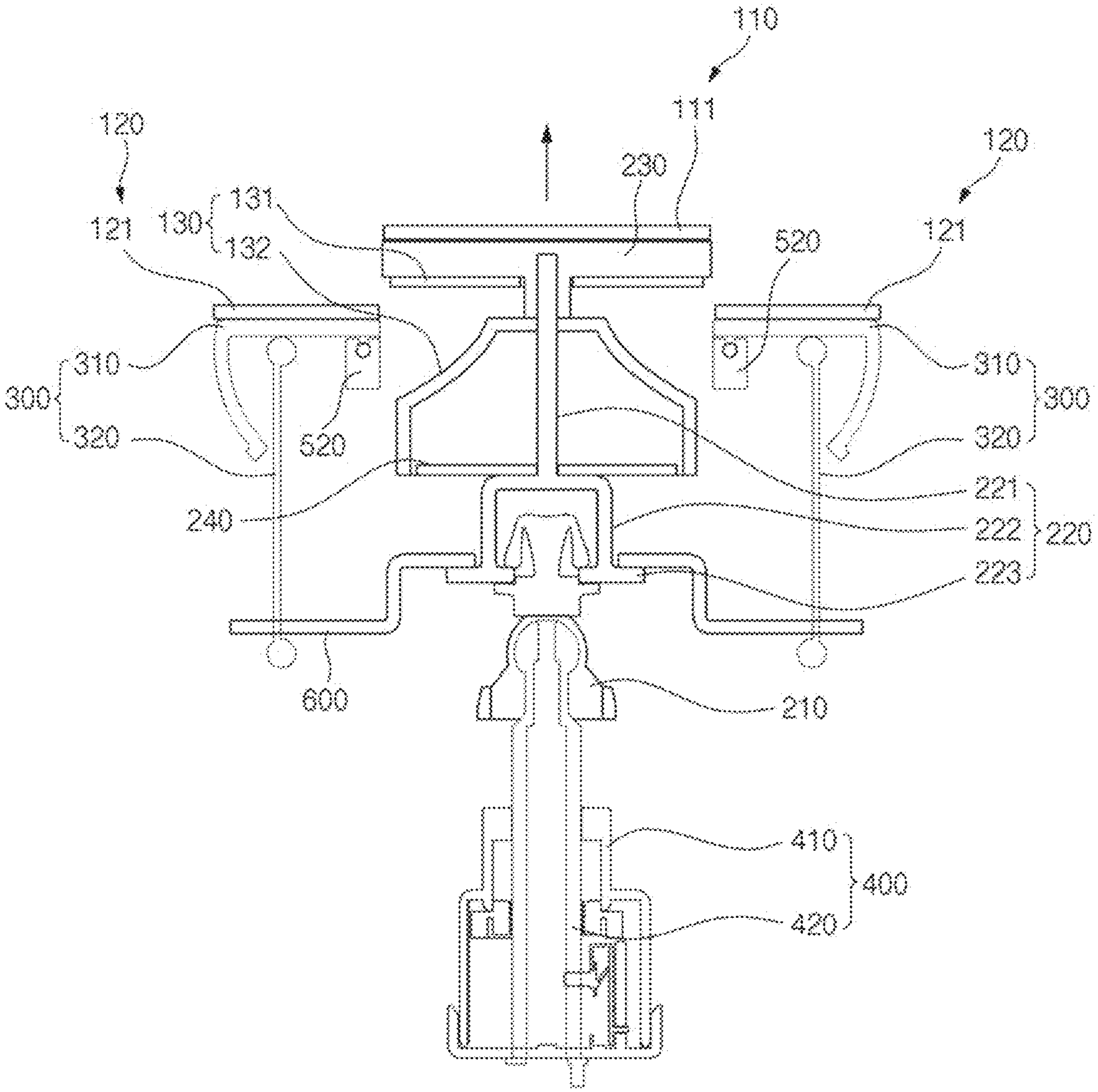
FIG. 19 is a cross-sectional view illustrating a state, in which a movable part is moved in FIG. 18.
Figure 20:
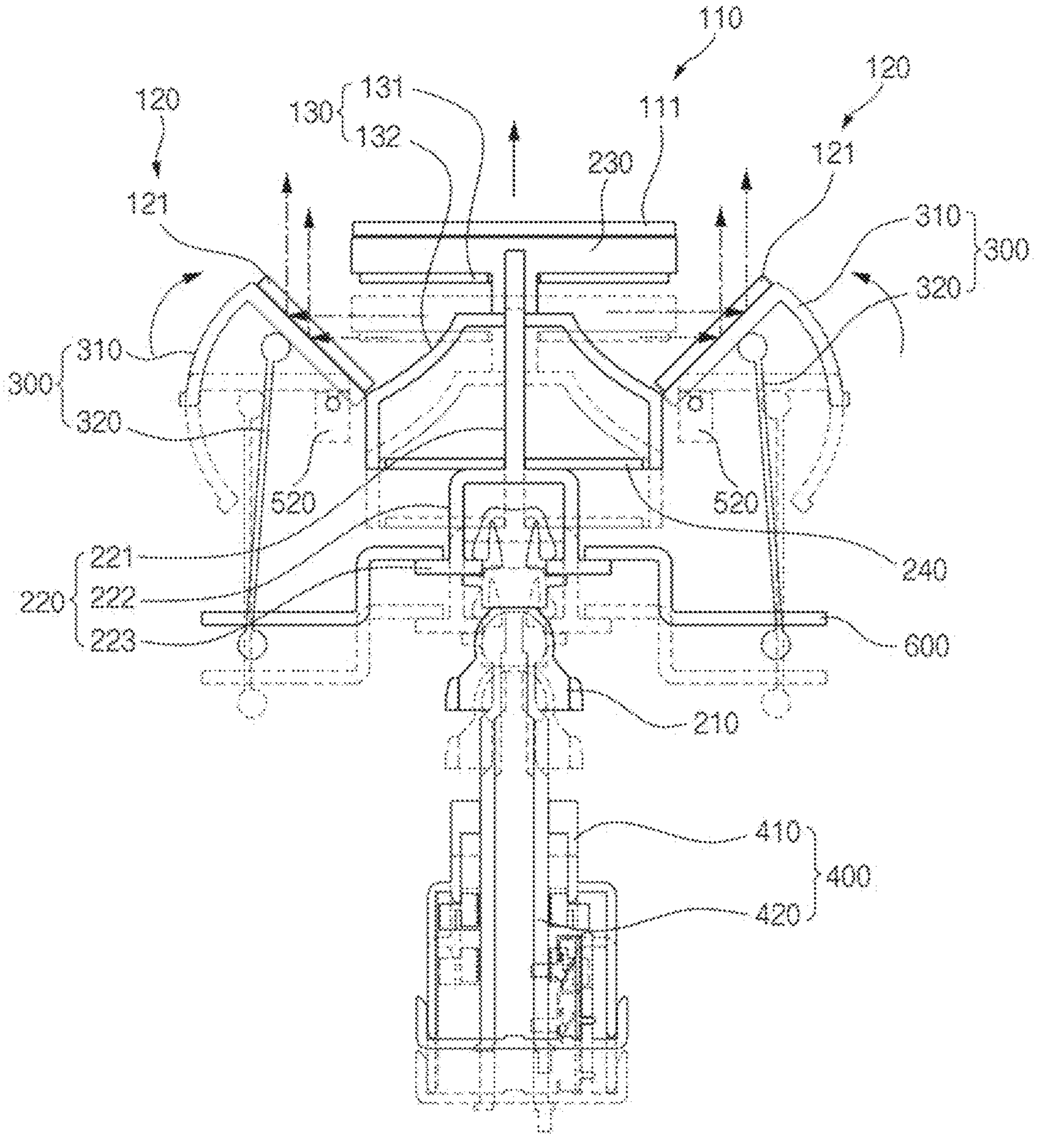
FIG. 20 is a cross-sectional view illustrating a state, in which a rotatable part is moved in FIG. 19.

FIG. 11 is a perspective view illustrating the lamp module according to the first embodiment of the present disclosure, FIG. 12 is a front view illustrating a front side of the lamp for a vehicle according to the first embodiment of the present disclosure, FIG. 13 is an exploded perspective view of the lamp for a vehicle according to the first embodiment of the present disclosure, which is illustrated in FIG. 11, FIG. 14 is a perspective view illustrating a first base plate according to the first embodiment of the present disclosure, FIG. 15 is a perspective view illustrating a second base plate according to the first embodiment of the present disclosure, FIG. 16 is a perspective view illustrating a portion of FIG. 11, FIG. 17 illustrates an operation of the lamp for a vehicle according to the first embodiment of the present disclosure, and illustrates a state, in which a movable part and a rotatable part are operated in FIG. 6, FIG. 18 is a cross-sectional view illustrating a cross-section of the lamp for a vehicle according to the first embodiment of the present disclosure, FIG. 19 is a cross-sectional view illustrating a state, in which a movable part is moved in FIG. 18, and FIG. 20 is a cross-sectional view illustrating a state, in which a rotatable part is moved in FIG. 19.

Referring to FIGS. 1 to 20, a lamp 1 for a vehicle according to the first embodiment of the present disclosure includes a plurality of lamp modules 10 and optical connection units 150.

The plurality of lamp modules 10 may be arranged. The plurality of lamp modules 10 may be arranged in at least one of a longitudinal direction and a transverse direction. For example, they may be arranged in one direction as in the embodiments illustrated in FIGS. 1 to 10. However, the arrangement of the lamp modules 10 is not limited thereto, and may be arranged in a direction that is perpendicular to the illustrated arranged direction.

Each of the lamp modules 10 may include a first optical unit 110, a second optical unit 120, and a third optical unit 130.

The first optical unit 110 forms a first light distribution part with light that is irradiated from a first light source part 111 and is configured to be movable.

The first optical unit 110 is configured to form the first light distribution part with the light irradiated from the first light source part 111.

In detail, the first optical unit 110 may include the first light source part 111, and the first light source part 111 may include a first board, and a plurality of first light sources that are mounted on the first board. For example, the first light source may be a light emitting diode (hereinafter, referred to as an LED) or a micro LED, and the first board may be a printed circuit board (PCB).

For example, the first board may be of a plate type, and a plurality of first light sources may be arranged on the first board while forming a form of a matrix. However, the present disclosure is not limited thereto, and the first light sources may be arranged on the first board irregularly. One or two or more first light sources may constitute an individual unit of pixels. The first light sources may be turned on or off in unit of pixels according to a control of a controller (not illustrated), or a brightness and a color thereof may be adjusted. Accordingly, a first light distribution part formed by the first optical unit 110 may output various images of different shapes, or may output various images of brightness and colors. That is, the first light distribution part formed by the first optical unit 110 may be converted to various images.

The second optical unit 120 forms a second light distribution part with light that is irradiated from the second light source part 121, is provided around the first optical unit 110, and is configured to be rotatable.

In detail, the second optical unit 120 may include the second light source part 121, and the second light source part 121 may include a second board, and a plurality of second light sources. When a plurality of second optical units 120 are provided, they may be operated integrally. Furthermore, the second optical unit 120 may be operated separately from the first optical unit 110.

The second light source part 121 may have the same configuration and structure as those of the first light source part 111. In detail, the second light sources may be arranged on a second board while forming a form of a matrix, and one or a plurality of second light sources may constitute an individual unit of pixels. The second light sources may be turned on or off in unit of pixels according to a control of the controller, or a brightness and a color thereof may be adjusted. Accordingly, the second light distribution part formed by the second optical unit 120 may be converted to various images.

The third optical unit 130 forms a third light distribution part with light that is irradiated from a third light source part 131. Furthermore, the light irradiated from the third light source part 131 is configured to be output to an outside in a state, in which the first optical unit 110 is moved and the second optical unit 120 is rotated.

In detail, the third optical unit 130 may be configured to irradiate light to an outside through dynamic conversion of the first optical unit 110 and the second optical unit 120. Here, the first optical unit 110, the second optical unit 120, and the third optical unit 130 may be configured to be individually turned on or off.

Meanwhile, the present disclosure may further include a fourth optical unit 140. A plurality of fourth optical units 140 may form a fourth light distribution part with light that is irradiated from a fourth light source part 141, and may be disposed around the first optical unit 110.

In detail, the fourth optical unit 140 may include the fourth light source part 141, and the fourth light source part 141 may include a fourth board, and a plurality of fourth light sources that are mounted on the fourth board. For example, the fourth light sources may be arranged along columns and rows on the fourth board while forming a form of a matrix. One or two or more fourth light sources may constitute individual unit pixels. The fourth light sources may be turned on or off in unit of pixels, and the brightness and colors thereof may be adjusted. Accordingly, the fourth light distribution part formed by the fourth optical unit 140 may be converted to various images.

For example, the fourth optical unit 140 may be disposed at a circumference of the first optical unit 110, and may be disposed between adjacent second light source modules. Furthermore, the fourth optical unit 140 may be configured to be maintained in a static state while a location thereof is not adjusted when a movable part 200 and a rotatable part 300 are driven, but the present disclosure is not limited thereto.

Meanwhile, an optical connection unit 150 is provided between adjacent lamp modules 10 and includes a connection light source part 151.

Furthermore, the optical connection unit 150 is configured to connect adjacent second optical units 120 when the second optical unit 120 is moved or not moved.

In detail, a lamp module 10 according to the present disclosure, as described above, may be configured such that the lighting image of the lamp is converted through driving of the first optical unit 110 and the second optical unit 120. When the plurality of lamp modules 10 are arranged, a gap is formed in consideration of conversion of driving parts. For example, as in the illustrated example, a space for rotation may be secured when the second optical unit 120 is rotated.

Due to the space for conversion, an intermittent texture may be caused between the plurality of lamp modules 10. Accordingly, the lamp image may be viewed in an intermittent form when the lamp is turned off, and an intermittent texture may be caused in the lighting image when the lamp is turned on. In this case, the product value is degraded and a design thereof is restricted.

According to the present disclosure, the optical connection units 150 may be disposed between the plurality of lamp modules 10 to solve this. The optical connection units 150 may be installed between the lamp modules 10, some configurations of which are driven to convert images, to function to enhance lighting of the lamp 1 for a vehicle and a connection texture of the non-lighting image.

In detail, the optical connection unit 150 may be installed to cover a space for driving of rotation of the second optical unit 120 when viewed from a front side Z1. Accordingly, the lamp image may be viewed in a connected form around connection portions of the plurality of lamp modules 10.

Furthermore, the connection light source part 151 may be configured to connect adjacent second light source parts 121. Accordingly, when the lamp 1 for a vehicle is turned on, a form, in which the lighting image is connected at the connection portions of the plurality of lamp modules 10 by the connection light source parts 151, is implemented. Then, the connection light source part 151 may be formed to be stepped from the second light source part 121. In detail, the connection light source part 151 may be configured to protrude to a front side Z1 as compared with the second light source part 121. Accordingly, the lighting image may be viewed in a connected form when viewed from the front side Z1 while a space for rotation of the second optical unit 120 is secured.

According to the lamp 1 for a vehicle according to the first embodiment of the present disclosure, the lighting image and the pattern image may be converted in a three-dimensional way and dynamically, and thus, lamp image of various designs may be implemented.

Furthermore, according to an embodiment of the present disclosure, through adjustment of locations of the first optical unit 110 and the second optical unit 120, an entire amount of light may be increased while the light by the third optical unit 130 is added, and thus, a stability of the vehicle may be secured because visibility is enhanced, in particular, during a bad weather.

Furthermore, according to an embodiment of the present disclosure, even when the plurality of lamp modules 10 that perform conversion dynamically are connected to each other, an intermittent texture of the lamp image may be improved and exposure of internal parts to an outside may be minimized, and thus, a lighting connection performance may be improved and product value may be enhanced.

Meanwhile, the lighting mage formed when the first light source part 111, the second light source part 121, and the third light source part 131 are turned on may be configured to be converted through movement of the first optical unit 110 and rotation of the second optical unit 120.

The lighting image formed by the lamp 1 for a vehicle according to an embodiment may largely classified into a first lighting image that is formed before movement of the first optical unit 110 and rotation of the second optical unit 120, and a second lighting image that is formed through rotation of the first optical unit 110 and the second optical unit 120.

The first lighting image may be formed when the first light source part 111 and the second light source part 121 are turned on in an initial state.

In detail, the first lighting image is an image that is formed in a static state, in which the locations of the first optical unit 110 and the second optical unit 120 are not changed. As described above, the first light source part 111 and the second light source part 121 may be configured to convert the lighting image to various images in a static state as the first light source and the second light source are disposed on a board in a matrix form. The first lighting image may be an image by the lamp 1 for a vehicle in a usual case, and may be configured to various images in one lamp 1 for a vehicle.

The second lighting image may be formed to include the images by the first light source part 111, the second light source part 121, and the third light source part 131 in a state, in which the first optical unit 110 is moved and the second optical unit 120 is rotated. Furthermore, the second lighting image may include a fourth light distribution part.

In detail, the second lighting image is an image in a state, in which the locations of the first optical unit 110 and the second optical unit 120 are changed. The second lighting image may be implemented in a three-dimensional image through operations of the first optical unit 110 and the second optical unit 120, and an amount of the light may be enhanced while the third optical unit 130 is added. Accordingly, it may be configured to be implemented when various images are necessary or in case of a bad whether such as heavy rain.

Meanwhile, the lamp 1 for a vehicle according to an embodiment may further include a lamp housing 20, on which the plurality of lamp modules 10 and the optical connection units 150 are mounted. The lamp housing 20 may be provided with a space for accommodating the plurality of lamp modules 10.

The lamp module 10 includes the base plate part, the movable part 200, the rotatable part 300, and a driving part 400.

The base plate part 500, 600, and 700 may be mounted on the lamp housing 20. The base plate part may function as a frame, on which the components that constitute the lamp module 10 are mounted.

The movable part 200 may be connected to the base plate part, may be connected to the first light source part 111, and may be configured to move the first light source part 111.

In detail, the movable part 200 may be coupled to the first light source part 111, and may linearly move the first light source part 111. Accordingly, the lighting image by the first light distribution part and the first light source part 111 may implement a three-dimensional image.

The rotatable part 300 may be connected to the base plate part, may be connected to the second light source part 121, and may be configured to interwork with the movable part 200 to rotate the second light source part 121.

The rotatable part 300 may be connected to the second light source part 121, and may be configured to interwork with the movable part 200 to rotate the second light source part 121.

In detail, the rotatable part 300 is a component for rotating the second light source part 121, and may be connected to the movable part 200 and may be coupled to the second light source part 121. When the movable part 200 is operated to move the first light source part 111, the rotatable part 300 may be configured to rotate the second light source part 121 while interworking it.

Furthermore, the rotatable part 300 may include a rotary bezel that is coupled to the second light source part 121 and is mounted on the base plate part to be rotatable.

The plurality of lamp modules 10 require spaces for rotation of the rotary bezel. The optical connection units 150 may be connected between adjacent rotary bezels while covering the spaces for rotation of the rotary bezels.

The driving part 400 may provide driving power to the movable part 200 and the rotatable part 300.

In detail, the driving part 400 may be connected to the movable part 200 to move the movable part 200 forwards or rearwards. Furthermore, the driving part 400 operate the rotatable part 300 while interworking it when the movable part 200 is moved. Accordingly, the driving part 400 may rotate the second optical unit 120 while moving the first optical unit 110.

When the first optical unit 110 and the second optical unit 120 performs dynamic conversion through the driving part 400, the light irradiated to the third light source part 131 may be configured to be irradiated to an outside. That is, the third light distribution part by the third optical unit 130 may be configured to be included in the lamp image of the lamp 1 for a vehicle according to the present disclosure in a state, in which the first light source part 111 is moved and the second light source part 121 is rotated. Then, an entire amount of the light irradiated by the lamp 1 for a vehicle may be increased while the light by the third light source part 131 is added.

According to the first embodiment of the present disclosure, because the movable part 200 and the rotatable part 300 is configured to interwork with each other with one driving part 400, the number of driving parts 400 may be minimized and costs may be reduced whereby volume and weight may be reduced.

Meanwhile, the optical connection unit 150 may further include a connection structure 160.

The connection structure 160 may be installed in the lamp housing 20 such that the connection light source part 151 may be mounted thereon, and may be provided between the rotary bezels provided in adjacent second optical units 120.

In detail, the connection structure 160 may function to mount the connection light source part 151 on the lamp housing 20. The connection structure 160 may be provided between adjacent rotary bezels, and may be installed to fill the gaps between the adjacent rotary bezels while not obstructing driving of rotation of the rotary bezels.

Hereinafter, a configuration of the connection structure 160 will be described with reference to FIG. 5. In the specification, a direction, in which light is output from the lamp module 10, is defined as a forward direction Z1, an opposite direction to the forward direction Z1 is defined as a rearward direction Z2, a direction, in which the adjacent lamp modules 10 are arranged, is defined as a first direction "Z", and a direction that is perpendicular to the forward direction Z1 and the first direction "Z" is defined as a second direction "Y".

The connection structure 160 may include an upper end part 161, an extension part 162, and a coupling part 167.

The upper end part 161 is coupled to the connection light source part 151. As the connection light source part 151 is installed in the upper end part 161, the connection structure 160 and the connection light source part 151 may be coupled to each other. The upper end part 161 may be formed to protrude further to the front side Z1 than the rotary bezel to be stepped in a non-driving state.

A pair of extension parts 162 may extend from opposite ends of the upper end part 161 in the first direction "Z", and be configured such that the rotary bezel is stopped during rotation of the second optical unit 120. Here, the extension part 162 may be formed in a form that does not obstruct rotation of the rotary bezel. That is, the extension part 162 may be formed in a shape in consideration of rotation of the second light source unit.

The coupling part 167 may be configured to protrude from the extension part 162 and may be coupled to the lamp housing 20. The coupling part 167 may protrude from the extension part 162 and may have various shapes as long as it may be coupled to the lamp housing 20.

For example, the coupling part 167 may include a coupling piece 168, a coupling boss 169, and a coupling hole 169*a*. The coupling pieces 168 may extend from the extension parts 162. The coupling pieces 168 may be formed at opposite ends of the extension parts 162 in the second direction "Y". The coupling boss 169 may protrude from the coupling piece 168 in a direction that faces an inner surface of the lamp housing 20. The coupling hole 169*a*, through which the coupling part 167, such as a bolt, may pass, may be formed in the coupling boss 169. The optical connection unit 150 may be installed in the lamp housing 20 by the coupling part 167.

Each of the pair of extension parts 162 may include an extension body 163 and a first separation preventing boss 164. Each of the pair of extension parts 162 may include the extension body 163 and the first separation preventing boss 164.

The extension body 163 may be configured to become farther away from the upper end part 161 as it goes to a rearward direction Z2, and may be formed to be curved in a direction, in which they face each other. In detail, the extension body 163 may have as body including a curved surface. Furthermore, cross-sections of the plurality of extension bodies 163 provided in the pair of extension parts 162, which are perpendicular to the second direction "Y" may be formed to be curved in a direction, in which they become farther as they go to the rearward direction Z2 while face each other. Accordingly, during rotation of the rotary bezel, the extension body 163 may not obstruct the rotary bezel.

The first separation preventing boss 164 may be formed at an upper end of the extension body 163 and protrude toward the rotary bezel such that the rotary bezel is stopped thereby. Furthermore, a second separation preventing boss 165 may be formed at a lower end of the extension body 163 and protrude toward the rotary bezel such that the rotary bezel is stopped thereby.

In detail, during rotation thereof, an upper end of the rotary bezel, which faces the extension structure, may be configured to be stopped by the first separation preventing boss 164 and a lower end thereof may be configured to be stopped by the second separation preventing boss 165. The first separation preventing boss 164 and the second separation preventing boss 165 may protrude in a direction that faces the rotary bezel, and may be configured such that an end of the rotary bezel is stopped thereby.

The first separation preventing boss 164 and the second separation preventing boss 165 may function to prevent separation of the rotary bezel while restricting rotation of the rotary bezel. For example, the pair of extension bodies 163, and the first separation preventing boss 164 and the second separation preventing boss 165 formed therein may be formed to be symmetrical to each other with respect to the upper end part 161.

FIG. 10 illustrates a lighting image by the lamp 1 for a vehicle according to an embodiment of the present disclosure. As illustrated, according to an embodiment of the present disclosure, a lighting image having an improved connection texture may be implemented.

Meanwhile, hereinafter, the lamp module according to the first embodiment of the present disclosure will be described in detail with reference to FIGS. 11 to 20.

First, detailed configurations of the movable part 200, the rotatable part 300, and the driving part 400 will be described.

The driving part 400 may include a first housing 410, a driving motor (not illustrated) provided in an interior of the first housing 410, and a driving shaft 420 configured to receive the driving power of the driving motor to be moved forwards or rearwards. Accordingly, the driving shaft 420 may be configured to be moved forwards or rearwards from the first housing 410 by the driving power of the driving motor. For example, the driving motor may be an actuator.

The movable part 200 may include a first retainer 210, a first retainer holder 220, a first main bezel 230, and a first movable plate 240.

The first retainer 210 may be coupled to the driving shaft 420 to support the driving shaft 420 that is moved forwards or rearwards while being rotated. In detail, the first retainer 210 may be coupled to an upper side (with respect to an upward/downward direction of the drawing) of the driving shaft 420 and may be provided between the first retainer holder 220 and the driving shaft 420.

The first retainer holder 220 may include a first movable rod 221, a body 222, and a first pressing part 223.

Here, the first movable rod 221 may have a rod shape, a lengthwise direction of which is the driving shaft 420. In detail, the first movable rod 221 may protrude from an upper surface (with respect to the upward/downward direction of the drawing) of the body 222 of the first retainer holder 220, which faces the first main bezel 230. Furthermore, when the driving shaft 420 is moved forwards or rearwards from the first housing 410, the first movable rod 221 may be moved forwards or rearwards through movement of the first retainer 210 coupled to the driving shaft 420 and the first retainer holder 220 coupled to the first retainer 210.

The body 222 is a part that defines the body of the first retainer holder 220, and one side thereof may be coupled to the first retainer 210 and the first movable rod 221 may extend from an opposite side thereof.

For example, the body 222 may have an interior space, into which the first retainer 210 may be inserted to be coupled. Furthermore, an insertion hole (not illustrated), into which the first retainer 210 may be inserted, may be formed at a lower end (with respect to the upward/downward direction of the drawing) of the body 222. That is, the body 222 may have a box shape having an insertion hole (not illustrated) at a lower end thereof.

The first pressing part 223 may extend horizontally along a circumference of the body 222 and may be configured to press a body 610 of the second base plate 600, which will be described below, upwards when the first retainer holder 220 is moved forwards.

For example, the first pressing part 223 may extend horizontally along a circumference of a lower end of the body 222, and may press and push the body 610 of the second base plate 600 upwards after contacting the lower end of the body 610 of the second base plate 600 when the driving shaft 420 is moved forwards.

The first light source part 111 may be installed in the first main bezel 230, and the first main bezel 230 may be fixed to an opposite end of the first movable rod 221 in a lengthwise direction thereof.

In detail, the first main bezel 230 is a member for linearly moving the first light source part 111, and may be fixed to an upper end part (with respect to the direction of the drawing) of the first movable rod 221. For example, the first main bezel 230 may have a plate shape, and may be perpendicular to the first movable rod 221. The first light source part 111 may be installed on a surface of the first main bezel 230, which faces a front side. Through movement of the first main bezel 230, the first optical unit 110 may convert an image dynamically.

The first movable plate 240 may have a through-hole, through which the first movable rod 221 passes, and may be configured to be spaced apart from a lower side of the first main bezel 230. For example, the first movable plate 240 may have a plate shape, and may be provided in parallel to the first main bezel 230, but the present disclosure is not limited thereto. Parts of the third optical unit 130 may be mounted on the first movable plate 240.

Meanwhile, the lamp module 10 according to the present disclosure may further include a first base plate 500 that is provided at a lower portion of the second light source part 121. The first base plate 500 may be mounted on the first housing (not illustrated).

The first base plate 500 may include a body 510, a first hinge coupling part 520, and a rod insertion groove 530.

The body 510 is a part that defines the body of the first base plate 500, and may have a through-hole 511, through which the first movable rod 221 passes. For example, the body 510 may have a ring shape, a central area of which is empty.

A plurality of first hinge coupling parts 520 may be formed in the body 510, and may be provided along a circumference of the through-hole 511. The rod insertion groove 530 may be formed on a side surface of the body 510 to be concave at a location corresponding to the first hinge coupling part 520. For example, the first hinge coupling part 520 may protrude upwards from the body 510, and the rod insertion groove 530 may be formed to be recessed concavely from a circumferential direction of the body 510 toward the through-hole 511. Each of the number of first hinge coupling parts 520 and the number of the rod insertion grooves 530 may correspond to the number of second optical units 120.

In addition, a plurality of first rotary bezel insertion grooves 540, into which the first rotary bezels 310, which will be described below, are inserted, may be formed in the first base plate 500 along a circumferential direction of the body 510. In detail, the first rotary bezel insertion groove 540 may be formed on a side surface of the body 510 to be concave at a location that is adjacent to the rod insertion groove 530.

Here, the first rotary bezel insertion groove 540 may have various shapes. For example, the first rotary bezel insertion groove 540 may have a shape, in which a distance between facing inner walls having grooves become farther away from each other as they become close to the circumferential direction of the body 510. In this case, when the lamp module 10 is assembled, interferences between the first rotary bezel insertion groove 540 and the first rotary bezel 310 are minimized whereby the lamp module 10 may be easily assembled.

It is apparent that the above-described shape of the first rotary bezel insertion groove 540 also may be applied to the rod insertion groove 530 in the same way.

Meanwhile, the lamp module 10 according to the present disclosure may further include the second base plate 600 that is provided on a lower side of the first movable plate 240.

The second base plate 600 may include the body 610 and a rod coupling part 620.

The body 610 is a part that defines the body of the second base plate 600, and may have a through-hole 611, through which the first movable rod 221 passes. That is, the body 610 may have a ring shape, a central area of which is empty.

Here, a size of the through-hole 611 may be formed to be larger than a size of the body 222 of the first retainer holder 220 and smaller than a size of the first pressing part 223 of the first retainer holder 220 such that the body 610 is pressed by the first pressing part 223 of the first retainer holder 220, which is described above, upwards.

Meanwhile, the body 610 may have a plate shape, but the present disclosure is not limited thereto.

For example, as illustrated in FIG. 5, the body 610 may have a multi-stepped shape that is stepped in the upward/downward direction along a circumference of the through-hole 611. In this case, the body 610 may minimize distortion of the body 610 by minimizing a difference of stresses generated due to the first pressing part 223 and a rotatable member 320 that will be described below.

Furthermore, the body 610 may include a reinforcing rib that is installed on the stepped surface formed in the body 610 to be perpendicular thereto to supplement a strength of the body 610. Here, the reinforcing rib may have various shapes, such as a linear shape or a nonlinear shape.

A plurality of rod coupling parts 620 may be formed in the body 610, and may be provided along a circumference of the through-hole 611. For example, the rod coupling parts 620 may protrude from the body 610 downwards, and the number thereof may correspond to the number of second optical units 120 and the number of rotatable members 320.

Meanwhile, it is apparent that a rod insertion groove 630 formed on the side surface of the body to be concave may be formed at a location corresponding to the rod coupling part 620. For example, the rod insertion groove 630 may be formed to be recessed concavely from a circumferential direction of the body 510 toward the through-hole 611. The number of rod insertion grooves 630 may correspond to the number of the second optical units 120. As an example, as illustrated in FIG. 5, the rod coupling parts 620 may be provided on an opposite side of an area of the body 610, on which the rod insertion groove 630 is formed, in a circumferential direction thereof.

Meanwhile, the rotatable part 300 may include the first rotary bezel 310 and the rotatable member 320.

The second light source part 121 may be mounted on the first rotary bezel 310, and the first rotary bezel 310 may be hinge-coupled to the first hinge coupling part 520 to be mounted on the first base plate 500 to be rotatable. The locations and the number of first rotary bezels 310 may correspond to those of the second optical units 120, and the second light source part 121 may be mounted on a surface thereof, which faces a front side that is a light irradiation direction. A hinge boss that is connected to the first hinge coupling part 520 to be rotatable may be formed in the first rotary bezel 310, and the first rotary bezel 310 may be rotated about the first hinge coupling part 520.

Furthermore, the first rotary bezel 310 may have various shapes. For example, as illustrated in FIG. 8, a side surface (with respect to the upward/downward direction of the drawing) of the first rotary bezel 310 may have a curved surface shape. In detail, a side surface of the first rotary bezel 310 may be formed to be curved to face an interior of the lamp module 10 as it goes downwards.

One end of the rotatable member 320 may be hinge-coupled to the first rotary bezel 310 and an opposite end thereof may be hinge-coupled to the rod coupling part 620 of the second base plate 600, and the rotatable member 320 may be inserted into the rod insertion groove 530 and 630. Then, hinge bosses that are connected to the first rotary bezel 310 and the rod coupling part 620 to be hinge-coupled thereto so as to be rotatable may be formed at opposite ends of the rotatable member 320. Furthermore, the number of rotatable members 320 may correspond to the number of first rotary bezels 310. (see FIG. 8)

The rotatable member 320 may be moved upwards together with the movable part 200 after the movable part 200 is moved upwards by a specific distance, and when the rotatable member 320 is moved, the rotatable member 320 may press the first rotary bezel 310 whereby the first rotary bezel 310 is rotated such that the third light source part 131 is exposed and thus an amount of the light of the lamp module 10 may be increased.

Hereinafter, an operation scheme of the rotatable part 300 will be described in detail.

The rotatable member 320 is moved when the second base plate 600 because it is connected to the second base plate 600. However, because the first pressing part 223 of the first retainer holder 220 and the body 610 of the second base plate 600 are spaced apart from each other, the rotatable member 320 is maintained in a stop state before the movable part 200 is moved by a specific distance or more, that is, before the first pressing part 223 of the first retainer holder 220 and a lower end of the body 610 of the second plate 600 contact each other. (see FIGS. 8 and 9)

Because the first pressing part 223 pushes the body 610 upwards after the movable part 200 is moved by a specific distance or more, that is, after the first pressing part 223 of the first retainer holder 220 contacts a lower end of the body 610 of the second base plate 600, the rotatable member 320 is moved upwards together with the second base plate 600 that is pressed upwards to be moved.

Because the rotatable member 320 is moved upwards, the rotatable member 320 may press the first rotary bezel 310. In detail, because the rotatable member 320 is hinge-coupled to the first rotary bezel 310 and the rod coupling part 620, it may be rotated to be inclined toward a center of the lamp module 10, and the first rotary bezel 310 may be pressed by the rotatable member 320 to be rotated about the first hinge coupling part 520. (see FIG. 10)

Accordingly, movement of the movable part 200 and rotation of the rotatable part 300 may interwork with each other.

Meanwhile, the third light source part 131 may be installed on a rear surface of the first main bezel 230, which faces the first movable plate 240. That is, the first light source part 111 may be installed on a front surface of the first main bezel 230, and the third light source part 131 may be installed on a rear surface of the first main bezel 230.

Furthermore, the third optical unit 130 may further include a reflection part 132. The reflection part 132 may be installed in the first movable plate 240 to reflect the light irradiated from the third light source part 131. For example, the reflection part 132 may have a curved surface shape that is curved in a direction that faces the first movable plate 240, but the shape of the reflection part 132 is not limited thereto.

Furthermore, the light reflected by the reflection part 132 may be configured to be reflected by the first rotary bezel 310. Here, the first rotary bezel 310 may be coated with a reflective material such that the light reflected by the reflection part 132 is reflected to an outside. Here, the reflective material may be aluminum that may reflect light.

For example, the reflective material may be deposited on a rear surface of the first rotary bezel 310, and the first rotary bezel 310 and the second board may be formed of a light transmitting material. Accordingly, the light irradiated from the third light source part 131 may be reflected by the first rotary bezel 310 after passing through the second light source part 121. Due to the rotation of the first rotary bezel 310 and the movement of the first main bezel 230, a space may be defined between the first rotary bezel 310 and the first main bezel 230, and the light reflected by the first rotary bezel 310 may be irradiated to a front side through the space. Furthermore, a rear surface of the first main bezel 230, which faces the reflection part 132, also may be coated with the reflective material. Accordingly, the light irradiated from the third light source part 131 and the light irradiated to the first main bezel 230 through the reflection part 132 may be reflected to the reflection part 132 again.

Meanwhile, the embodiment of the present disclosure may further include a first sub bezel 700, on which the fourth optical unit 140 is mounted. Furthermore, the first base plate 500 may further include a first bezel fixing part 550, which is disposed between the first hinge coupling part 520 and to which the first sub bezel 700 is fixed.

That is, the first bezel fixing part 550 may be formed to correspond to a location of the first sub bezel 700, and may be coupled to the first sub bezel 700 through bolting, pin-coupling, or the like. Accordingly, the first sub bezel 700, and the fourth optical unit 140 coupled thereto may not perform mechanical conversion, such as rotation or movement. However, as described above, the fourth optical unit 140 may convert an image in a static state.

Figure 21:
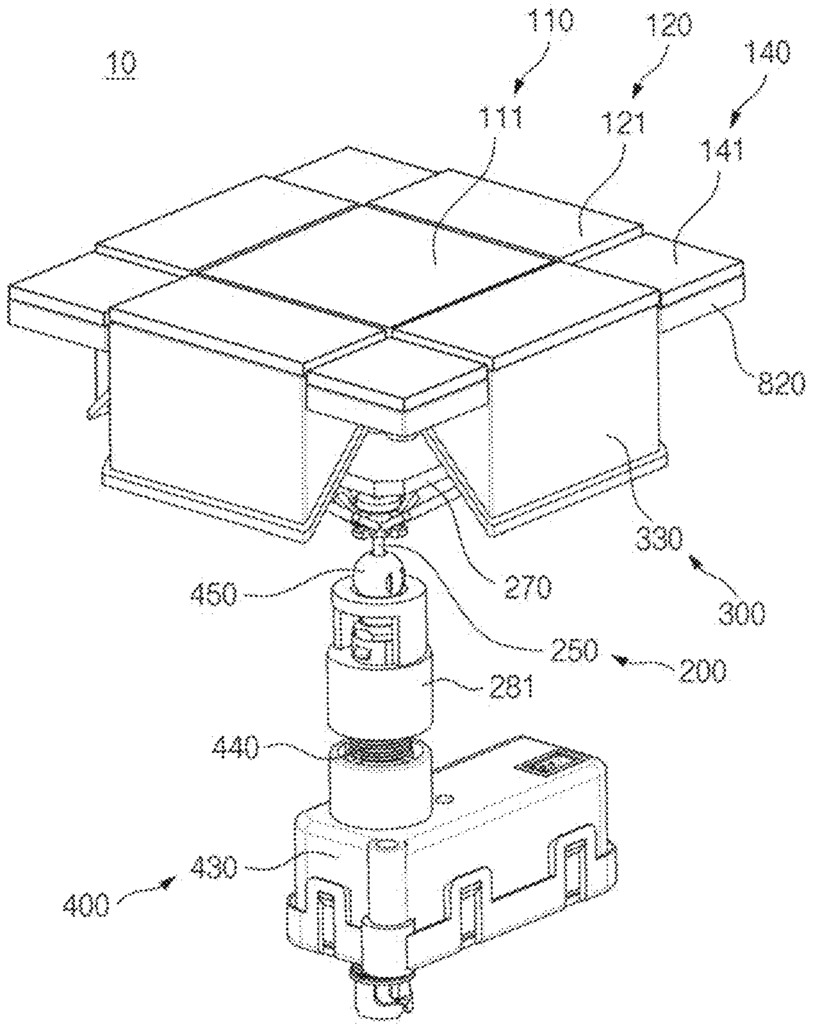
FIG. 21 is a perspective view illustrating a lamp module according to a second embodiment of the present disclosure.
Figure 22:
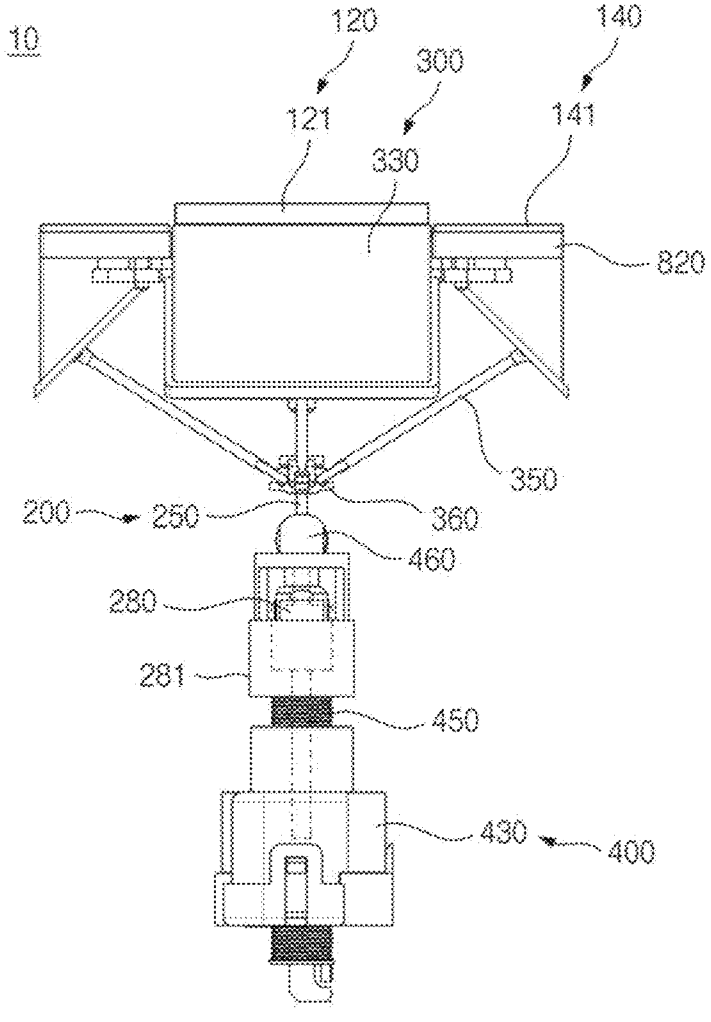
FIG. 22 is a front view illustrating a front surface of a lamp for a vehicle according to a second embodiment of the present disclosure.
Figure 23:
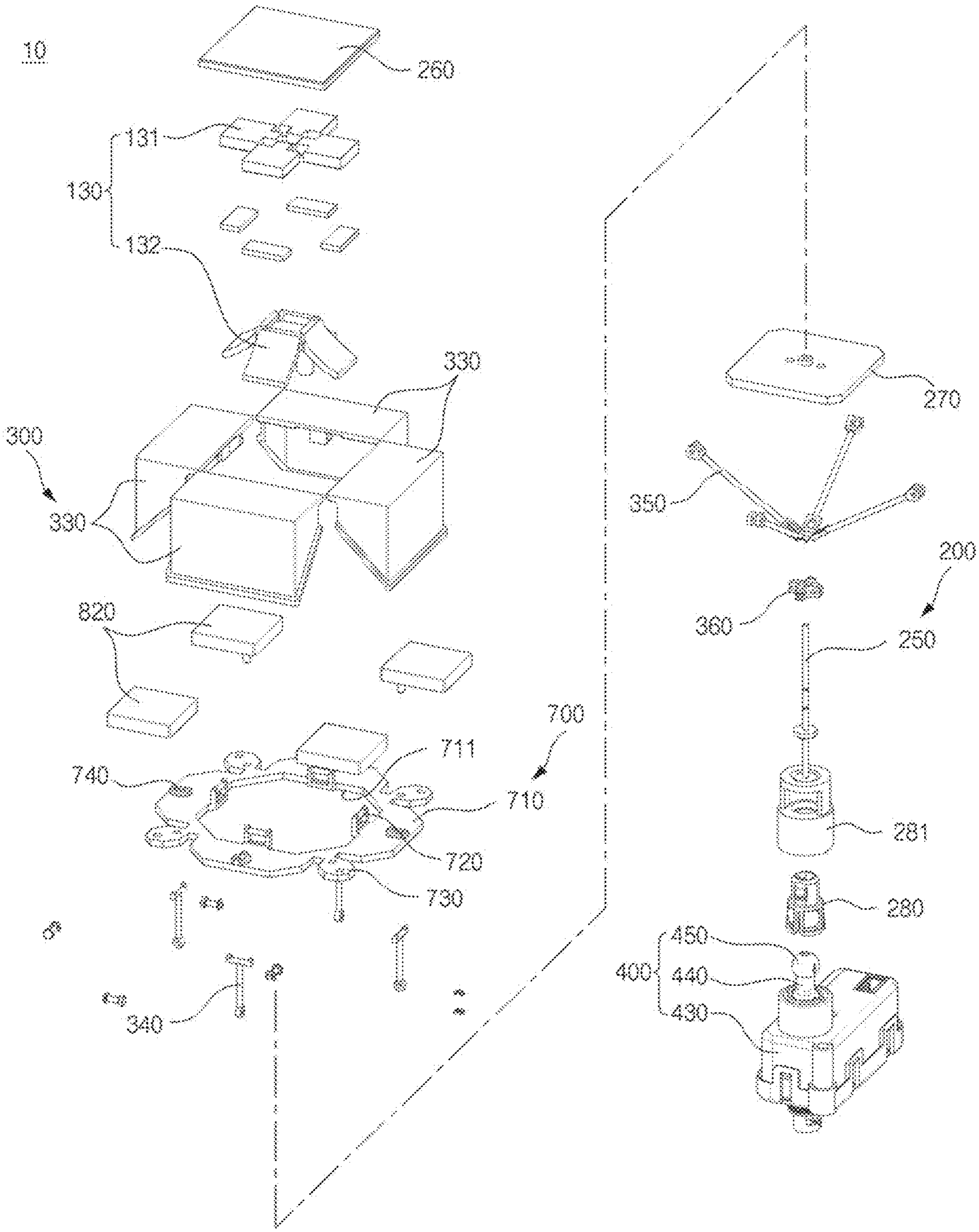
FIG. 23 is an exploded perspective view illustrating a lamp for a vehicle according to a second embodiment of the present disclosure, which is illustrated in FIG. 21.
Figure 24:
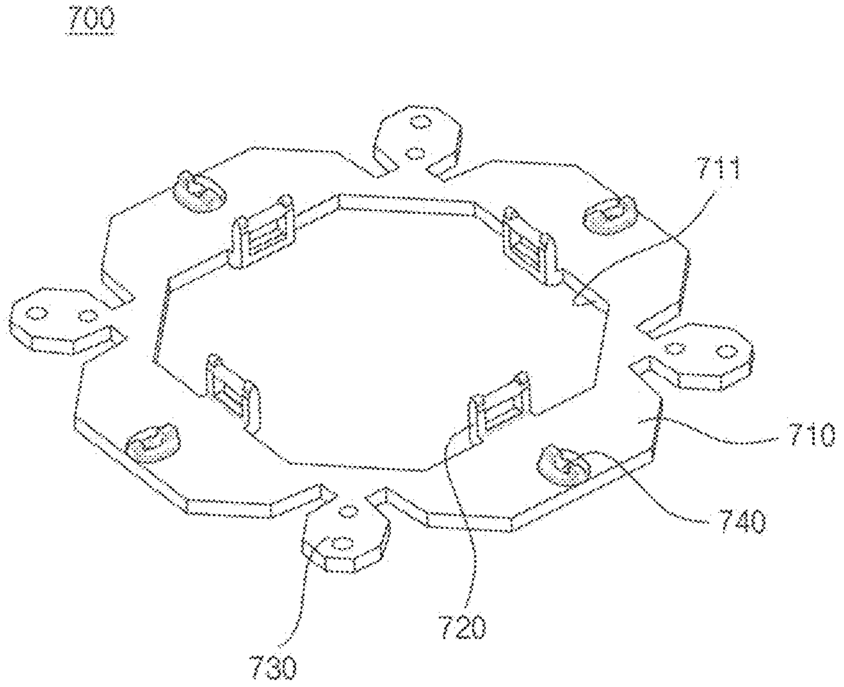
FIG. 24 is a perspective view illustrating a base plate according to a second embodiment of the present disclosure.
Figure 25:
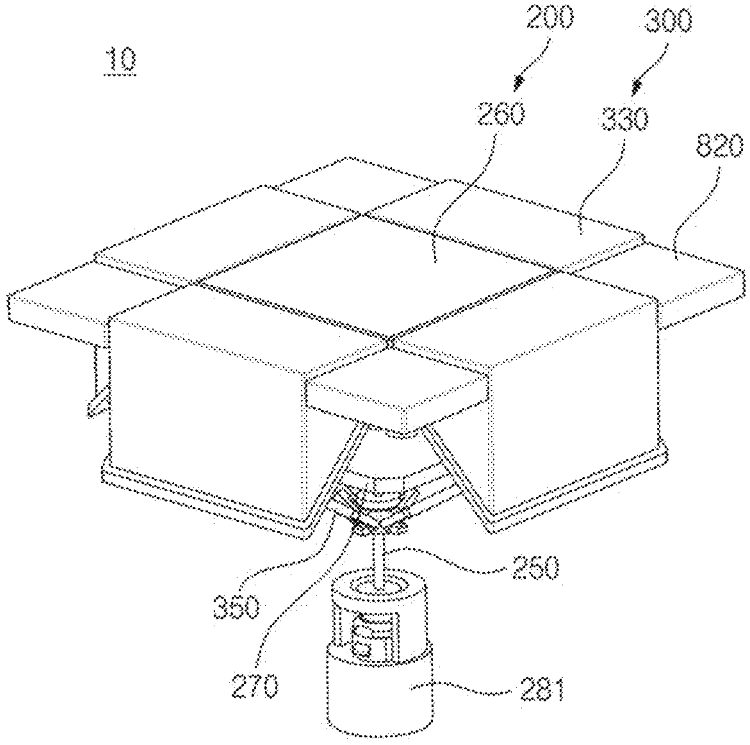
FIG. 25 is a perspective view illustrating a portion of FIG. 21.
Figure 26:
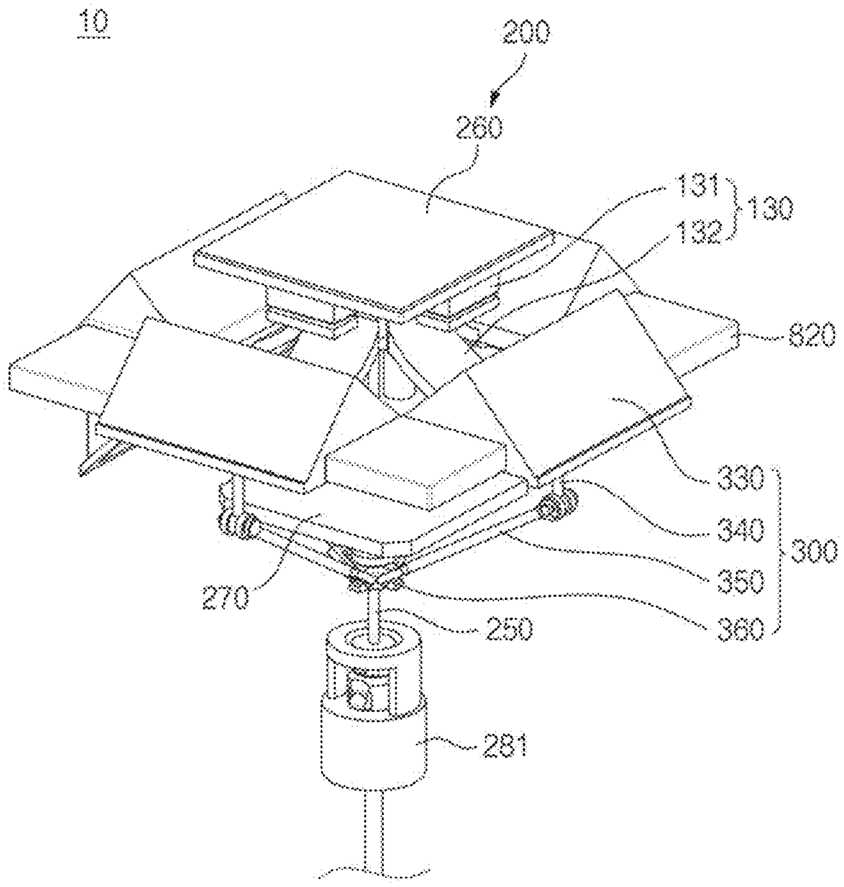
FIG. 26 illustrates an operation of a lamp for a vehicle according to a second embodiment of the present disclosure, and illustrates a state, in which a movable part and a rotatable part are operated in FIG. 25.
Figure 27:
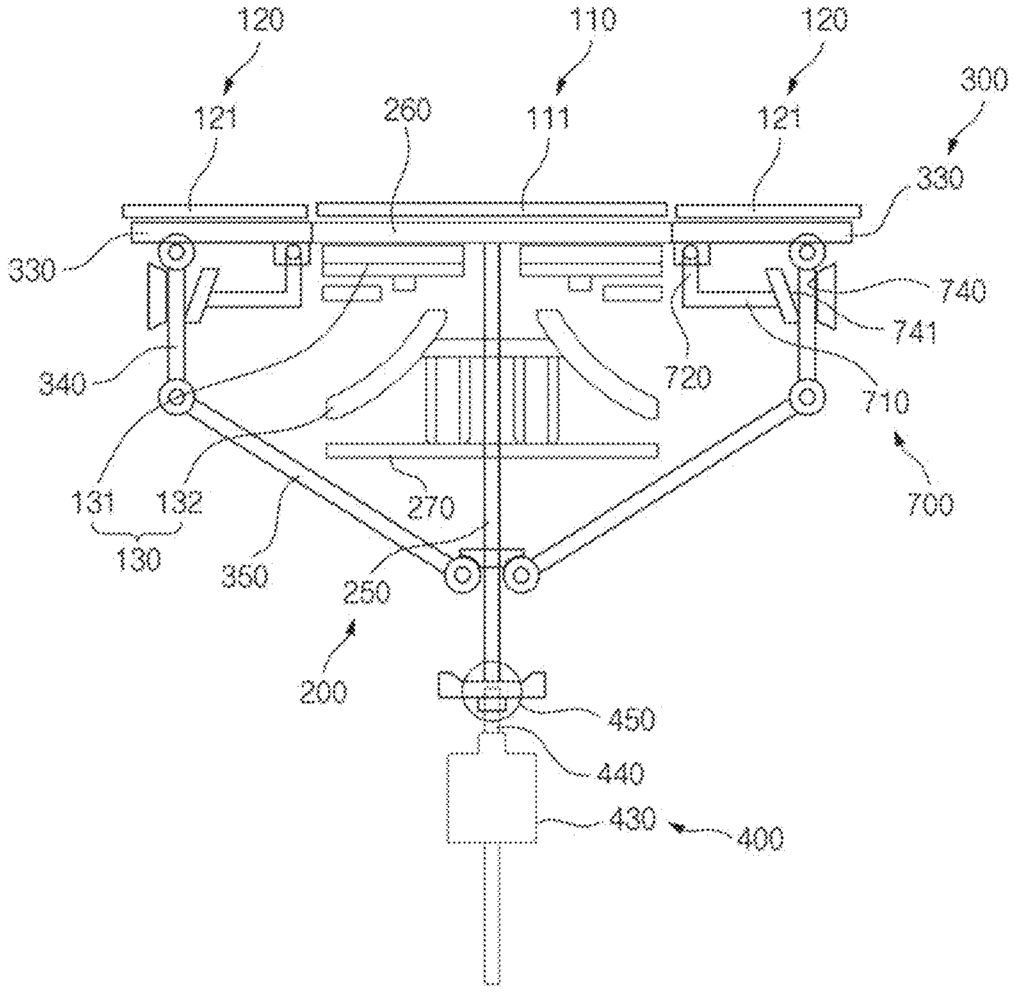
FIG. 27 illustrates a lamp for a vehicle according to a second embodiment of the present disclosure, and is a cross-sectional view illustrating a cross-section of FIG. 25.
Figure 28:
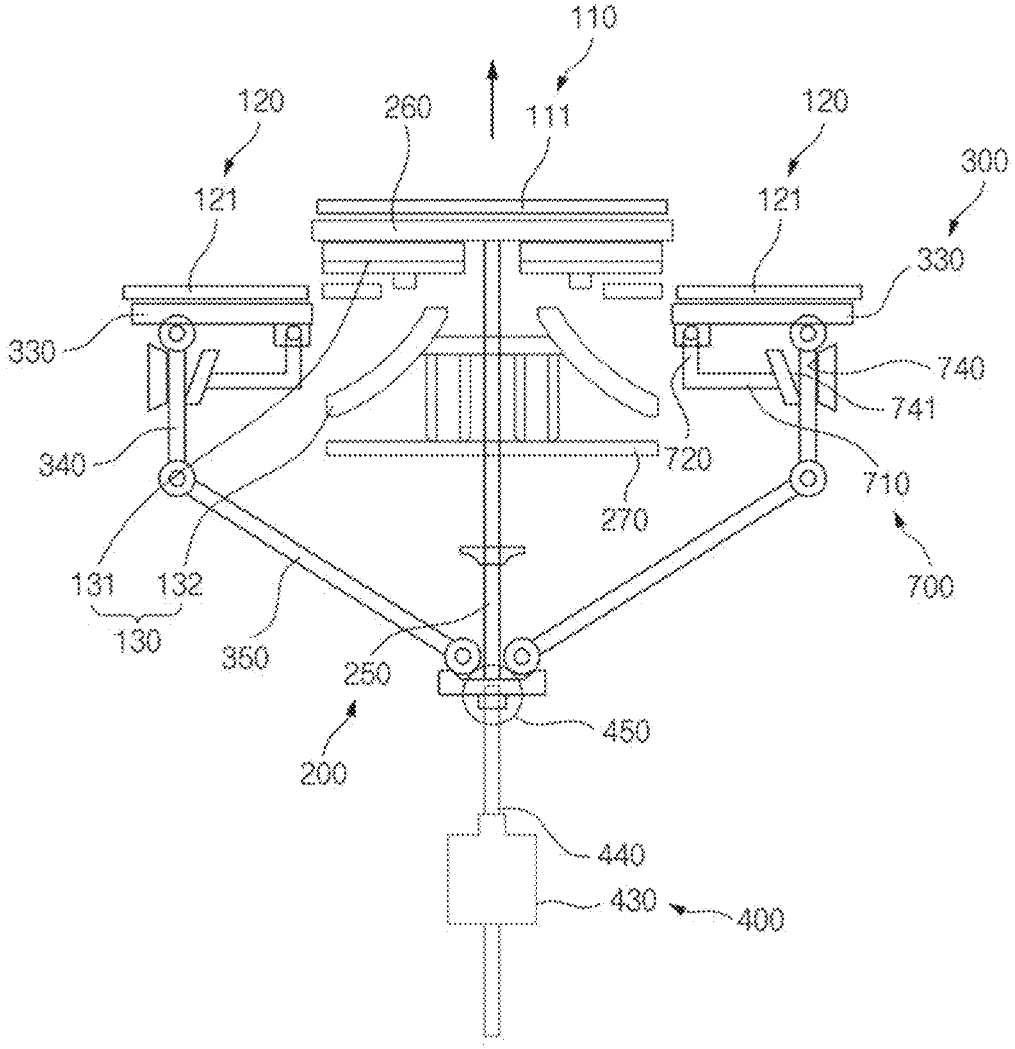
FIG. 28 is a cross-sectional view illustrating a state, in which a movable part is moved in FIG. 27.
Figure 29:
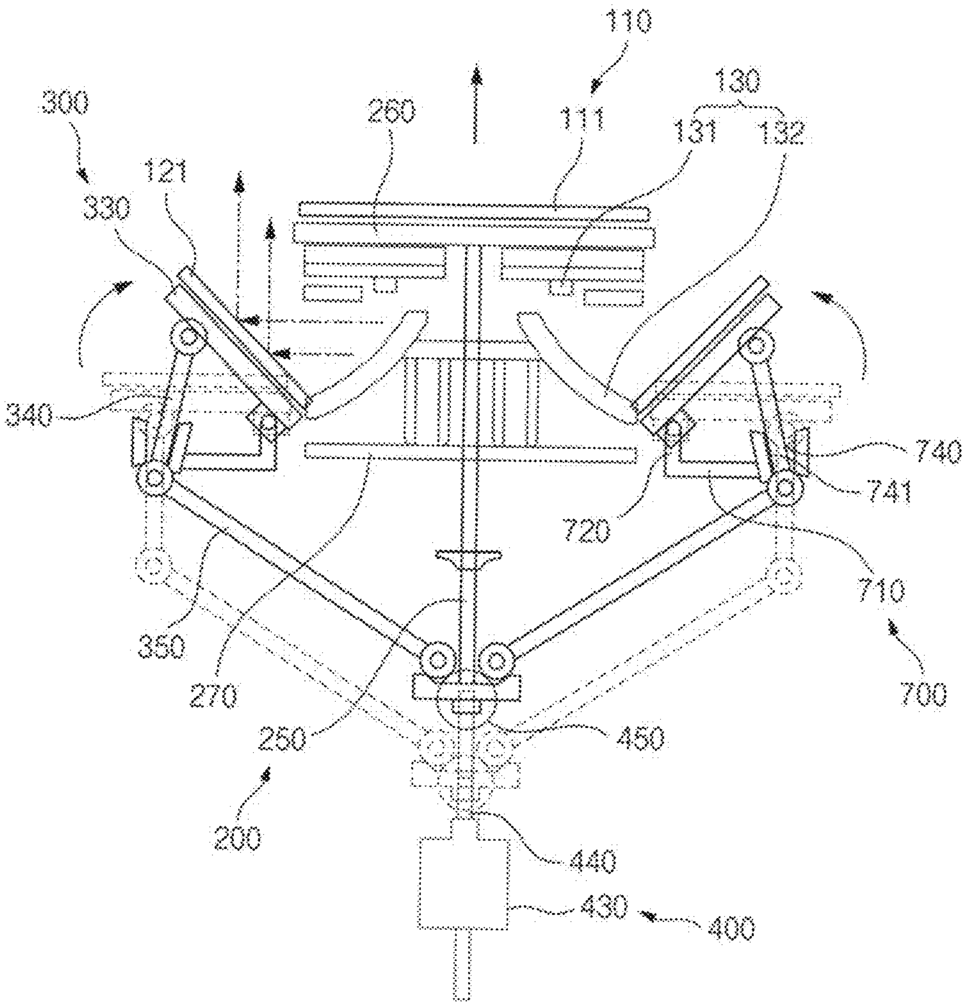
FIG. 29 is a cross-sectional view illustrating a state, in which a rotatable part is rotated in FIG. 28.

Meanwhile, FIGS. 21 to 29 illustrate a lamp for a vehicle according to a second embodiment of the present disclosure. FIG. 21 is a perspective view illustrating a lamp module according to a second embodiment of the present disclosure, FIG. 22 is a front view illustrating a front surface of the lamp for a vehicle according to the second embodiment of the present disclosure, FIG. 23 is an exploded perspective view illustrating the lamp for a vehicle according to the second embodiment of the present disclosure, which is illustrated in FIG. 21, FIG. 24 is a perspective view illustrating a base plate according to the second embodiment of the present disclosure, FIG. 25 is a perspective view illustrating a portion of FIG. 21, FIG. 26 illustrates an operation of the lamp for a vehicle according to the second embodiment of the present disclosure, and illustrates a state, in which a movable part and a rotatable part are operated in FIG. 25, FIG. 27 illustrates the lamp for a vehicle according to the second embodiment of the present disclosure, and is a cross-sectional view illustrating a cross-section of FIG. 25, FIG. 28 is a cross-sectional view illustrating a state, in which the movable part is moved in FIG. 27, and FIG. 29 is a cross-sectional view illustrating a state, in which the rotatable part is rotated in FIG. 28.

The second embodiment of the present disclosure is different from the above-described first embodiment in detailed configurations of a lamp module 20. Accordingly, the second embodiment of the present disclosure may include all components of the above-described optical connection unit 150. Furthermore, the second embodiment of the present disclosure may include all of features of the first optical unit 110, the second optical unit 120, the third optical unit 130, and the fourth optical unit 140, which have been described above. Hereinafter, a repeated description of the same components will be omitted.

First, hereinafter, detailed configurations of the movable part 200, the rotatable part 300, and the driving part 400 will be described. For reference, FIGS. 1, 2, and 7 to 9 illustrate the first to fourth optical units, and the first optical unit, the second optical unit, and the fourth optical unit are omitted in FIGS. 3, 5, and 6.

For example, the driving part 400 may be an actuator. The driving part 400 may include a second housing 450, a driving motor (not illustrated) that is provided in an interior of the second housing 450, a screw rod that receives driving power of the driving motor to be rotated, and a second driving shaft 440 that is connected to the screw rod to be moved forwards or rearwards during rotation of the screw rod. Accordingly, the second driving shaft 440 may be inserted into or extracted from the second housing 450 by the driving power of the driving motor and may be configured to be moved forwards or rearwards.

The movable part 200 may include a second movable rod 280, a main bezel 260, and a second movable plate 270.

The second movable rod 280 may extend along a central axis of the second driving shaft 440, and one end in a lengthwise direction thereof may be coupled to the second driving shaft 440 to be moved together with the second driving shaft 440.

In detail, the second movable rod 280 may have a rod shape, and a lower end (with respect to the upward/downward direction of the drawing) thereof, which faces the driving part 400, may be fixed to an upper end part of the second driving shaft 440. The second movable rod 280 is moved while interworking with the movement of the second driving shaft 440 when the second driving shaft 440 may be inserted into or extracted from the second housing 450 to be moved forwards or rearwards.

For example, the movable part 200 may further include a second retainer 280 and a second retainer holder 281. The second retainer holder 281 may be provided at a lower end of the second movable rod 280, and the second retainer 280 may be provided between the second retainer holder 281 and the second driving shaft 440 to support rotation of the second driving shaft 440 that is moved forwards or rearwards while being rotated.

The first light source part 111 may be installed in the main bezel 260, and the main bezel 260 may be fixed to an opposite end of the second movable rod 280 in a lengthwise direction.

In detail, the main bezel 260 is a member for linearly moving the first light source part 111, and may be fixed to an upper end part (with respect to the direction of the drawing) of the second movable rod 280. For example, the main bezel 260 have a plate shape, and may be perpendicular to the second movable rod 280. The first light source part 111 may be installed on a surface of the main bezel 260, which faces a front side. The first optical unit 110 may dynamically convert an image through movement of the main bezel 260.

The second movable plate 270 may be fixed to the second movable rod 280 and may be spaced apart from the main bezel 260. For example, the second movable plate 270 may have a plate shape and may be parallel to the main bezel 260, but the present disclosure is not limited thereto. Parts of the third optical unit 130 may be mounted on the second movable plate 270.

Meanwhile, the lamp module 10 according to the present disclosure may further include a base plate 700. The base plate 700 may be mounted on the housing (not illustrated) and may function to support the rotatable part 300.

The base plate 700 may include a body 710, a hinge coupling part 720, and a link through-hole 740.

The body 710 is a part that defines the body of the base plate 700, and may have a through-hole 711, through which the second movable rod 280 passes. That is, the body 710 may have a ring shape.

A plurality of hinge coupling parts 720 may be formed in the body 710, and may be provided along a circumference of the through-hole 711. The link through-hole 740 may pass through the body 710, and may be formed at a location corresponding to the hinge coupling part 720. For example, the hinge coupling part 720 may protrude upwards from the body 710, and the link through-hole 740 may be formed to pass through a front surface and a rear surface of the body 710. The number of hinge coupling parts 720 and the number of link through-holes 740 may correspond to the number of second optical units 120.

The rotatable part 300 may include a second rotary bezel 350, a first rotatable member 360, a second rotatable member 350, and a link holder 360.

The second light source part 121 may be mounted on the second rotary bezel 350, and the second rotary bezel 350 may be hinge-coupled to the hinge coupling part 720 to be mounted on the base plate 700 to be rotatable. The locations and number of the second rotary bezels 350 may correspond to those of the second optical unit 120, and the second light source part 121 may be mounted on a surface that faces a forward direction that is a light radiation direction. A hinge boss that is connected to the hinge coupling part 720 to be rotatable may be formed in the second rotary bezel 350, and the second rotary bezel 350 may be rotated about the hinge coupling part 720.

The first rotatable member 360 may be connected to the second rotary bezel 350 to be rotatable, and may pass through the link through-hole 740. The second rotatable member 350 may be connected to the first rotatable member 360 to be rotatable. The second movable rod 280 may pass through the link holder 360 to be movable, and the link holder 360 may be coupled to the second rotatable member 350 to be rotatable. Here, the number of first rotatable members 360 and the number of second rotatable member 350 may correspond to the number of second rotary bezels 350.

In detail, the second rotatable member 350 may be connected to the second movable rod 280 through the link holder 360. The link holder 360 may be connected to the second movable rod 280 to be slid. The link holder 360 may not be moved together when the second movable rod 280 is moved, and may be pressed by the second driving shaft 440 to be moved when the second movable rod 280 is moved. While the link holder 360 is moved, the second rotatable member 350 may be rotated.

The first rotatable member 360 may be connected to the second rotatable member 350 to be rotatable through a rotary pin, and may be rotated about the rotary pin while interworking the second rotatable member 350 when the second rotatable member 350 is rotated. The first rotatable member 360 may be moved forwards to a front side of the base plate 700 through the link through-hole 740 during rotation thereof, and then, the first rotatable member 360 may press the second rotary bezel 350. The second rotary bezel 350 may be pressed by the first rotatable member 360 to be rotated about the hinge coupling part 720 (see FIG. 9). Through this process, movement of the movable part 200 and rotation of the rotatable part 300 may interwork with each other.

Here, an inclined surface 741 may be formed on a surface of the link through-hole 740, which faces the through-hole 711. The inclined surface 741 may be formed to be inclined at a specific angle on an inner surface thereof, which faces the through-hole 711 to restrict a rotation angle of the first rotatable member 360. In detail, referring to FIG. 9, the first rotatable member 360 may contact the inclined surface 741 during rotation thereof, and the first rotatable member 360 may be inclined toward the central axis by an angle corresponding to an angle of the inclined surface 741. In this way, by the angle of the inclined surface 741 of the link through-hole 740, rotation angles of the first rotatable member 360 and the second rotary bezel 350 may be restricted.

A pressing tool 450 may be formed at an end of the second driving shaft 440. An end of the second movable rod 280 may be coupled to the pressing tool 450, and the pressing tool 450 may be configured to press the link holder 360 such that the second rotary bezel 350 is rotated by the first rotatable member 360 and the second rotatable member 350 when the second movable rod 280 is moved.

In detail, the pressing tool 450 may be formed to have a diameter that is larger than that of the second movable rod 280, and may contact the link holder 360 to press the link holder 360 in a movement direction while being moved together with the second movable rod 280.

The plurality of second rotary bezels 350 may be provided along a circumference of the main bezel 260, and rotation angles thereof may be changed by the driving part 400. As described above, a maximum rotation angle of the second rotary bezel 350 may be restricted by the link through-hole 740 of the base plate 700. Furthermore, according to a degree of the driving power of the driving part 400, that is, a degree, by which the pressing tool 450 presses the link holder 360, a rotation degree of the second rotary bezel 350 may be adjusted. Accordingly, a degree of conversion of images and an output amount of the third light source part 131 may be adjusted.

The third light source part 131 may be installed on a rear surface of the main bezel 260, which faces the second movable plate 270. That is, the first light source part 111 may be installed on a front surface of the main bezel 260, and the third light source part 131 may be installed on a rear surface of the main bezel 260.

Furthermore, the third optical unit 130 may further include the reflection part 132. The reflection part 132 may be installed in the second movable plate 270, and may be configured to reflect the light irradiated from the third light source part 131. For example, a shape of the reflection part 132 may have a curved surface shape to be curved in a direction that faces the second movable plate 270, but the shape of the reflection part 132 is not limited thereto.

Furthermore, the light reflected by the reflection part 132 may be configured to be reflected by the second rotary bezel 350. Here, the second rotary bezel 350 may be coated with a reflective material such that the light reflected by the reflection part 132 is reflected to an outside. Here, the reflective material may be aluminum that may reflect light.

For example, the reflective material may be deposited on a rear surface of the second rotary bezel 350, and the second rotary bezel 350 and the second board may be formed of a light transmitting material. Accordingly, the light irradiated from the third light source part 131 may be reflected by the second rotary bezel 350 after passing through the second light source part 121. Due to the rotation of the second rotary bezel 350 and the movement of the main bezel 260, a space may be defined between the second rotary bezel 350 and the main bezel 260, and the light reflected by the second rotary bezel 350 may be irradiated to a front side through the above space. Furthermore, the reflective material also may be coated on a rear surface of the main bezel 260, which faces the reflection part 132. Accordingly, the light irradiated from the third light source part 131 and the light irradiated to the main bezel 260 through the reflection part 132 may be reflected to the reflection part 132 again.

Meanwhile, the embodiment of the present disclosure may further include a second sub bezel 820, on which the fourth optical unit 140 is mounted. Furthermore, the base plate 700 may further include a third bezel fixing part 730, which is disposed between adjacent hinge coupling parts 720 and tot which the second sub bezel 820 is fixed.

That is, the third bezel fixing part 730 may be formed to correspond to a location of the second sub bezel 820, and may be coupled to the second sub bezel 820 through bolting, pin-coupling, or the like. Accordingly, the second sub bezel 820, and the fourth optical unit 140 coupled thereto may not perform mechanical conversion, such as rotation or movement. However, as described above, the fourth optical unit 140 may convert images in a static state.

According to the lamp for a vehicle according to the embodiment of the present disclosure, the lighting image and the pattern image may be converted in a three-dimensional way and dynamically, and thus, lamp images of various designs may be implemented.

Furthermore, according to an embodiment of the present disclosure, through adjustment of locations of the first optical unit and the second optical unit, an entire amount of light may be increased while the light by the third optical unit is added, and thus, a stability of the vehicle may be secured because visibility is enhanced, in particular, during a bad weather.

Furthermore, according to the embodiment of the present disclosure, even when a plurality of lamp modules that perform conversion dynamically are connected to each other, an intermittent texture of the lamp image may be improved and exposure of internal parts to an outside may be minimized, and thus, a lighting connection performance may be improved and product value may be enhanced.

Although the specific embodiments of the present disclosure have been described above, the spirits and range of the present disclosure are not limited thereto, and the present disclosure may be variously corrected and modified by an ordinary person in the art, to which the present disclosure pertains, while not changing the essence of the present disclosure described in the claims.

What is claimed is:

1. A lamp for a vehicle, comprising:

a plurality of lamp modules; and optical connection units provided between adjacent lamp modules, each optical connection unit including a connection light source part, wherein each lamp module includes:

a first optical unit configured to form a first light distribution part with light irradiated from a first light source part and configured to be movable;

a second optical unit configured to form a second light distribution part with light irradiated from a second light source part, the second optical unit provided around the first optical unit and configured to be rotatable; and a third optical unit configured to form a third light distribution part with light irradiated from a third light source part, wherein the light irradiated from the third light source part is output by the lamp module when the first optical unit is moved and the second optical unit is rotated, and wherein the optical connection units are disposed between adjacent second optical units.

2. The lamp of claim 1, wherein a lighting image formed when the first light source part, the second light source part, and the third light source part are turned on is changed through movement of the first optical unit and rotation of the second optical unit.

3. The lamp of claim 2, wherein the lighting image includes:

a first lighting image formed when the first light source part and the second light source part are turned on in an initial state; and a second lighting image formed to include the first light source part, the second light source part, and the third light source part in a state in which the first optical unit is moved and the second optical unit is rotated.

4. The lamp of claim 1, wherein the connection light source part is connected between adjacent second light source parts.

5. The lamp of claim 1, wherein each lamp module includes:

a base plate part;

a movable part connected to the base plate part and the first light source part, and configured to move the first light source part;

a rotatable part connected to the base plate part and the second light source part, and configured to rotate the second light source part; and a driving part configured to provide driving power to the movable part and the rotatable part, wherein the rotatable part includes:

a rotary bezel coupled to the second light source part and mounted on the base plate part to be rotatable.

6. The lamp of claim 5, further comprising a lamp housing on which the plurality of lamp modules and the optical connection units are mounted, wherein each optical connection unit includes connection structures coupled to the lamp housing, on which the connection light source parts are mounted, and provided between rotary bezels located between two adjacent second optical units.

7. The lamp of claim 6, wherein:

when a direction in which lights are output from the lamp modules is defined as a forward direction and an opposite direction to the forward direction is defined as a rearward direction, a direction in which adjacent lamp modules are arranged is defined as a first direction, and a direction that is perpendicular to the forward direction and the first direction is defined as a second direction, the connection structure includes:

an upper end part coupled to the connection light source part; and a pair of extension parts extending from opposite ends of the upper end part in the first direction and configured to stop rotation of the rotary bezel during rotation of the second optical unit.

8. The lamp of claim 7, wherein each of the pair of extension parts includes:

an extension body, the extension bodies of the pair of extension parts being curved along a length thereof and further separated from each other with increasing distance from the upper end part; and a first separation preventing boss formed at upper ends of the respective extension bodies protruding toward the rotary bezel to stop rotation of the rotary bezel.

9. The lamp of claim 8, wherein each of the pair of extension parts further includes:

a second separation preventing boss formed at lower ends of the respective extension bodies and protruding toward the rotary bezel to stop rotation of the rotary bezel.

10. The lamp of claim 5, wherein the driving part includes a first driving shaft configured to be moved forwards or rearwards by the driving power of the driving part, and wherein the movable part includes:

a first retainer coupled to the driving part;

a first retainer holder, one side of which is coupled to the first retainer and from an opposite side of which a first movable rod extends, wherein a lengthwise direction of the first movable rod is a central axis of the first driving shaft;

a first main bezel in which the first light source part is installed, the first main bezel being fixed to one end of the first movable rod; and a first movable plate having a through-hole configured such that the first movable rod passes therethrough, the first movable plate being provided on a lower side of the first main bezel to be spaced apart therefrom.

11. The lamp of claim 10, wherein the base plate part includes:

a first base plate provided on a lower side of the second light source part, and wherein the first base plate includes:

a first body having a through-hole configured such that the first movable rod passes therethrough;

a plurality of first hinge coupling parts formed in the first body along a circumference of the through-hole; and a rod insertion groove formed on a side surface of the first body to be concave at a location corresponding to the first hinge coupling part, wherein the base plate part further comprises:

a second base plate provided on a lower side of the first movable plate, and wherein the second base plate includes:

a second body having a through-hole configured such that the first movable rod passes therethrough; and a plurality of rod coupling parts formed in the second body along a circumference of the second body.

12. The lamp of claim 11, wherein the first retainer holder comprises:

a holder body coupled to the first retainer; and a pressing part extending horizontally along a circumference of the holder body and configured to press the second body of the second base plate upwards when the first driving shaft is moved forwards.

13. The lamp of claim 12, wherein the rotatable part includes:

a first rotary bezel on which the second light source part is mounted, the first rotary bezel being hinge-coupled to the first hinge coupling part and mounted on the second base plate to be rotatable; and a rod member having one end hinge-coupled to the first rotary bezel, and an opposite end hinge-coupled to the rod coupling part and configured to be inserted into the rod insertion groove, wherein:

a plurality of first rotary bezels are provided along a circumference of the first main bezel, and rotation angles thereof are changed by the driving part; and number of rod members corresponds to number of the first rotary bezels.

14. The lamp of claim 13, wherein:

the third light source part is installed on a rear surface of the first main bezel and faces the first movable plate, and the third optical unit further comprises a reflection part installed in the first movable plate to reflect light irradiated from the third light source part, wherein:

light reflected by the reflection part is configured to be reflected through the rotary bezel, and the rotary bezel is coated with a reflective material to reflect the light reflected by the reflection part outside of the lamp.

15. The lamp of claim 11, further comprising:

a plurality of fourth optical units configured to form a fourth light distribution part with light irradiated from a fourth light source part and disposed at a circumference of the first optical unit; and a first sub bezel on which the fourth optical units are mounted, wherein the first base plate further comprises a first bezel fixing part to which the first sub bezel is fixed, the first bezel fixing part being disposed adjacent first hinge coupling parts.

16. The lamp of claim 5, wherein:

the driving part includes a second driving shaft configured to be moved forwards or rearwards by the driving power, and the movable part further comprises:

a second movable rod extending along a central axis of the second driving shaft and coupled to the second driving shaft to be moved together with the second driving shaft;

a second main bezel in which the first light source part is installed, the second main bezel fixed to an opposite end of the second movable rod in a lengthwise direction thereof; and a second movable plate fixed to the second movable rod and configured to be spaced apart from the second main bezel.

17. The lamp of claim 16, wherein the base plate part includes a third base plate that comprises:

a third body having a through-hole through which the second movable rod passes;

a plurality of second hinge coupling parts formed in the third body and provided along a circumference of the through-hole; and a link through-hole passing through the third body and formed at a location corresponding to the second hinge coupling part.

18. The lamp of claim 17, wherein the rotatable part includes:

a second rotary bezel on which the second light source part is mounted, the second rotary bezel being hinge-coupled to the second hinge coupling part so as to be mounted on the third base plate and be rotatable;

a first link member connected to the second rotary bezel to be rotatable and passing through the link through-hole;

a second link member connected to the first link member to be rotatable; and a link holder through which the second movable rod passes, the link holder coupled to the second link member to be rotatable.

19. The lamp of claim 18, wherein the link through-hole comprises an inclined surface formed on an inner surface thereof to be inclined at a specific angle to restrain a rotation angle of the first link member.

20. The lamp of claim 18, wherein:

an end of the second movable rod is coupled to an end of the second driving shaft, and a pressing tool is configured to press the link holder such that the second rotary bezel is rotated by the first link member and the second link member when the second movable rod is moved.

* * * * *